Aug. 22, 1967 R. G. E. DURAT 3,336,847
MACHINE FOR MANUFACTURING FRUSTO-CONICAL CONTAINERS MADE
OF SHEET MATERIAL, AND MORE SPECIFICALLY YOGHURT POTS
Filed Jan. 27, 1965 17 Sheets-Sheet 1
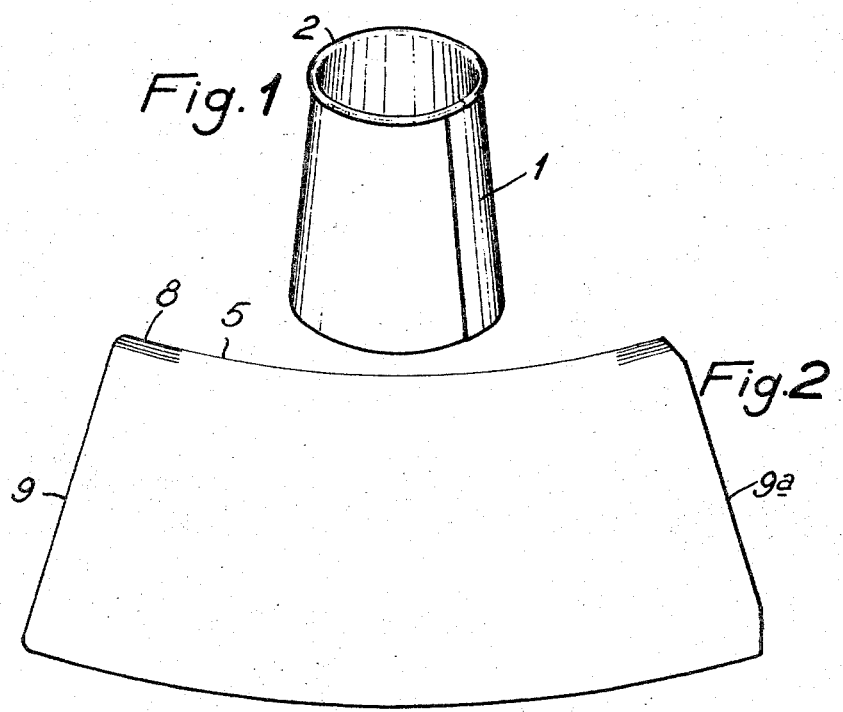
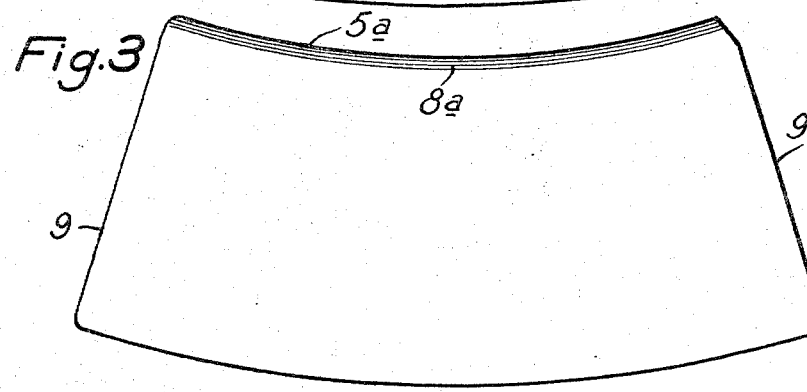
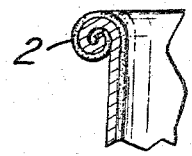
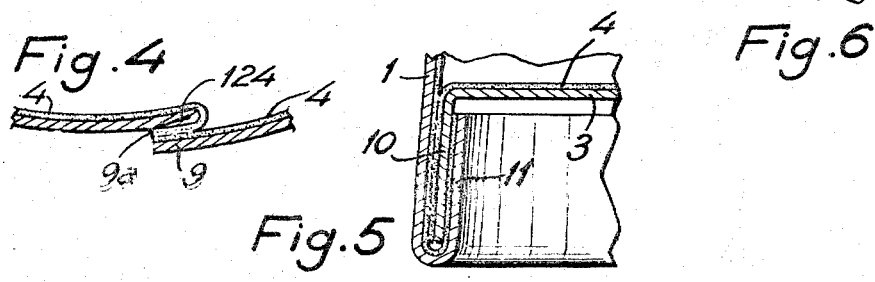

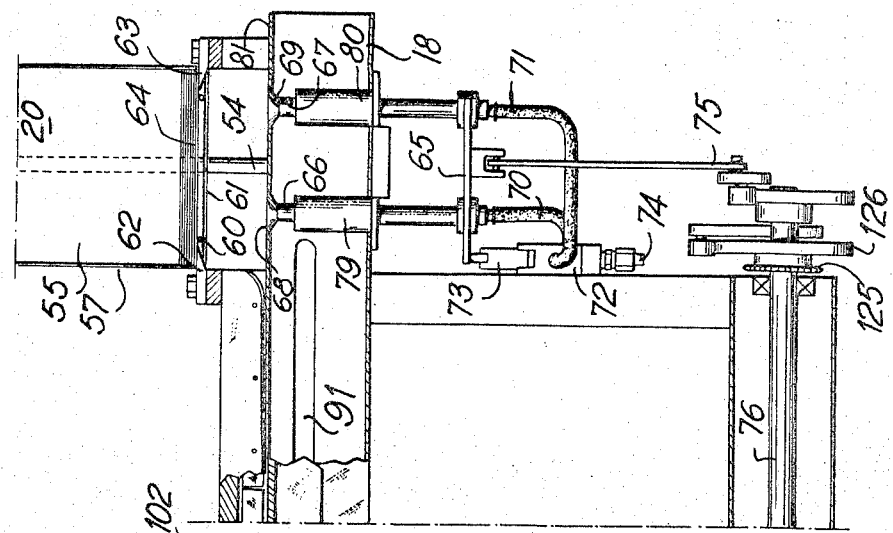
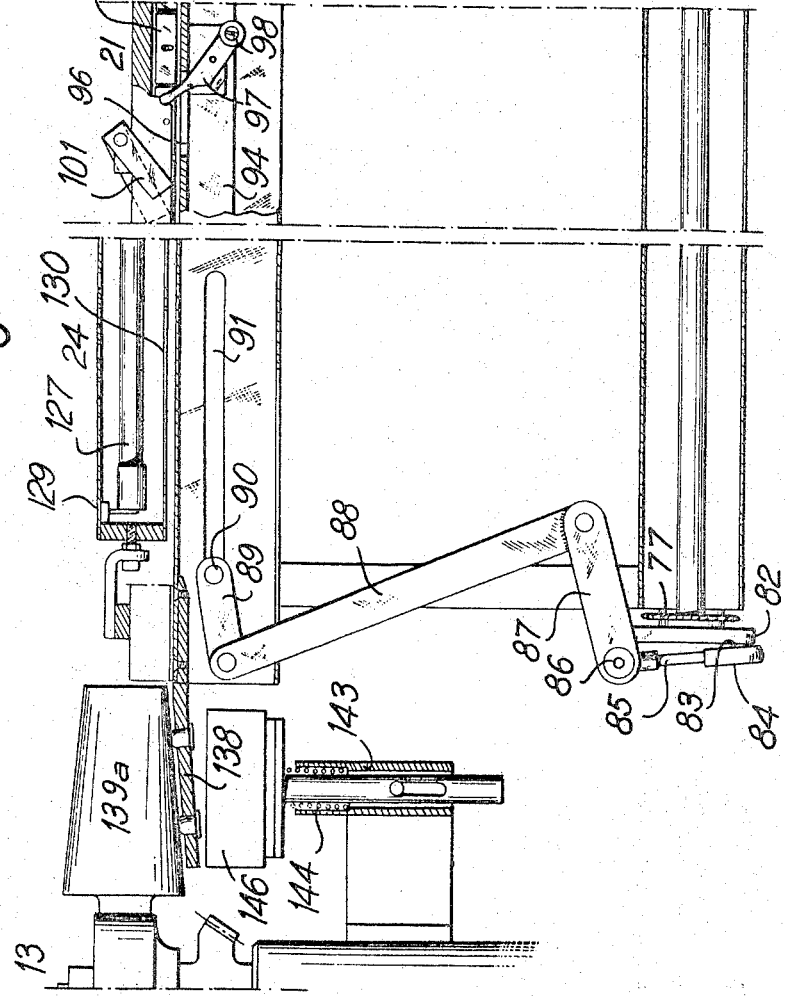
Fig. 11.

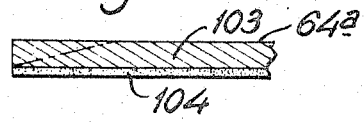
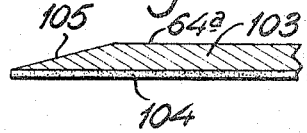
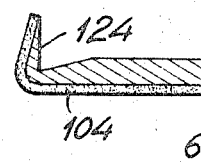
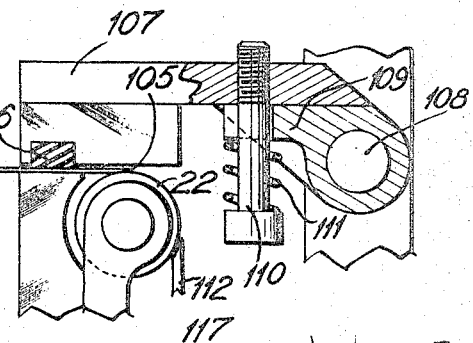
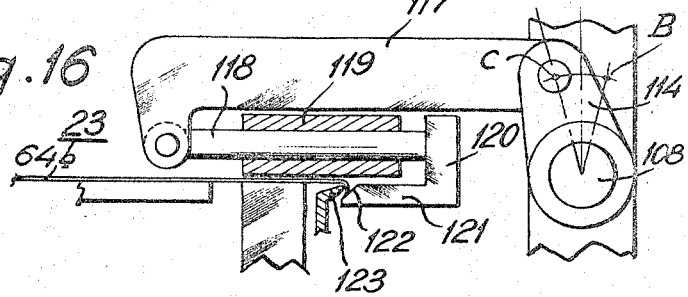
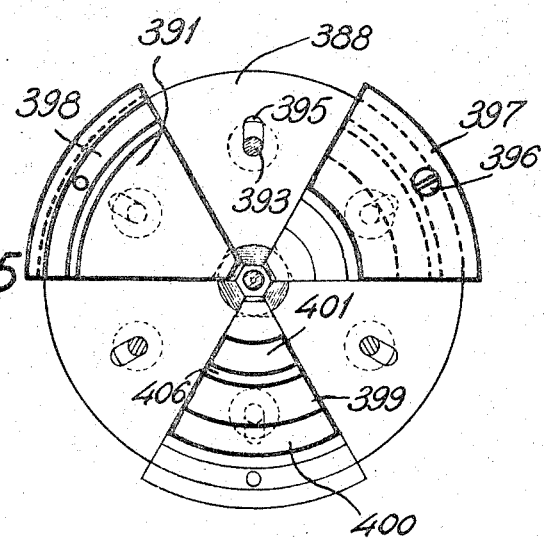

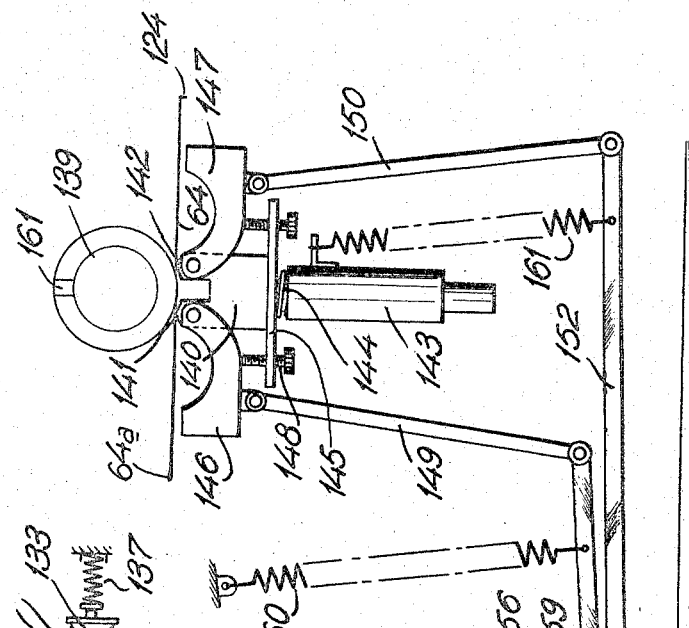
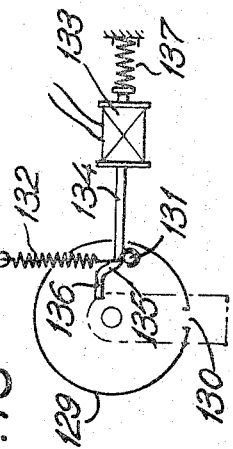
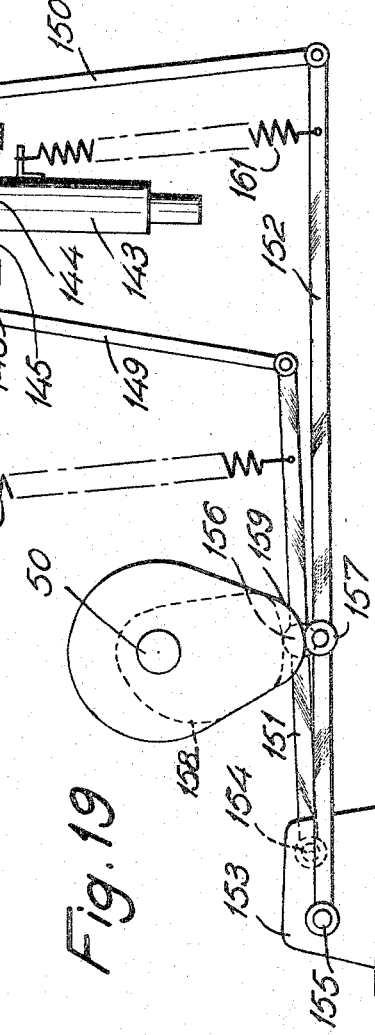
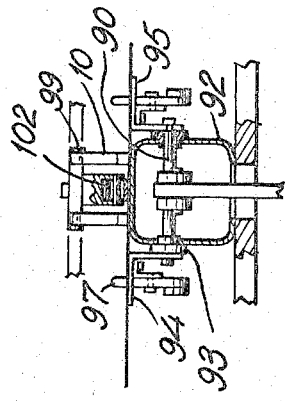
Fig. 17
Fig. 18
Fig. 19

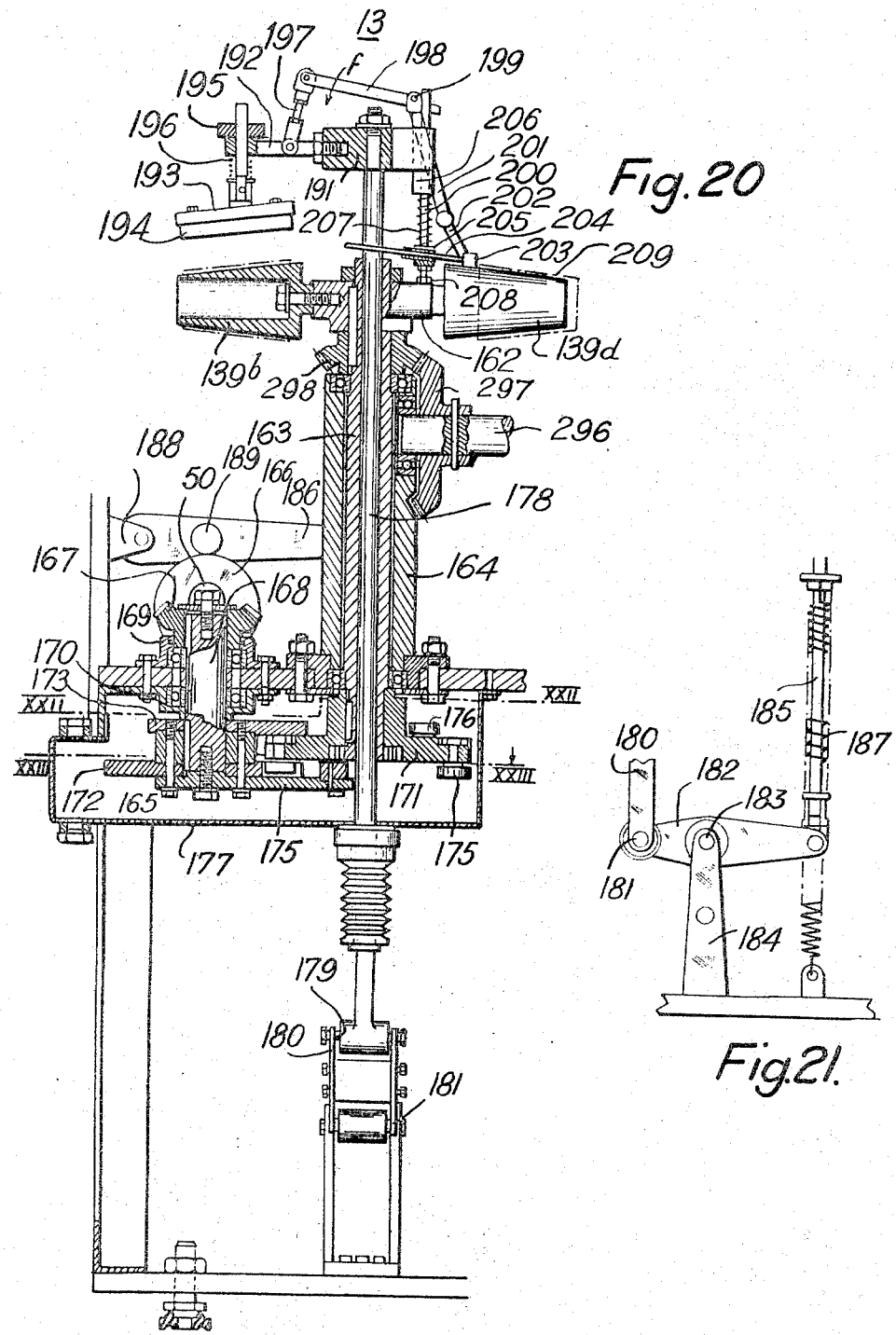

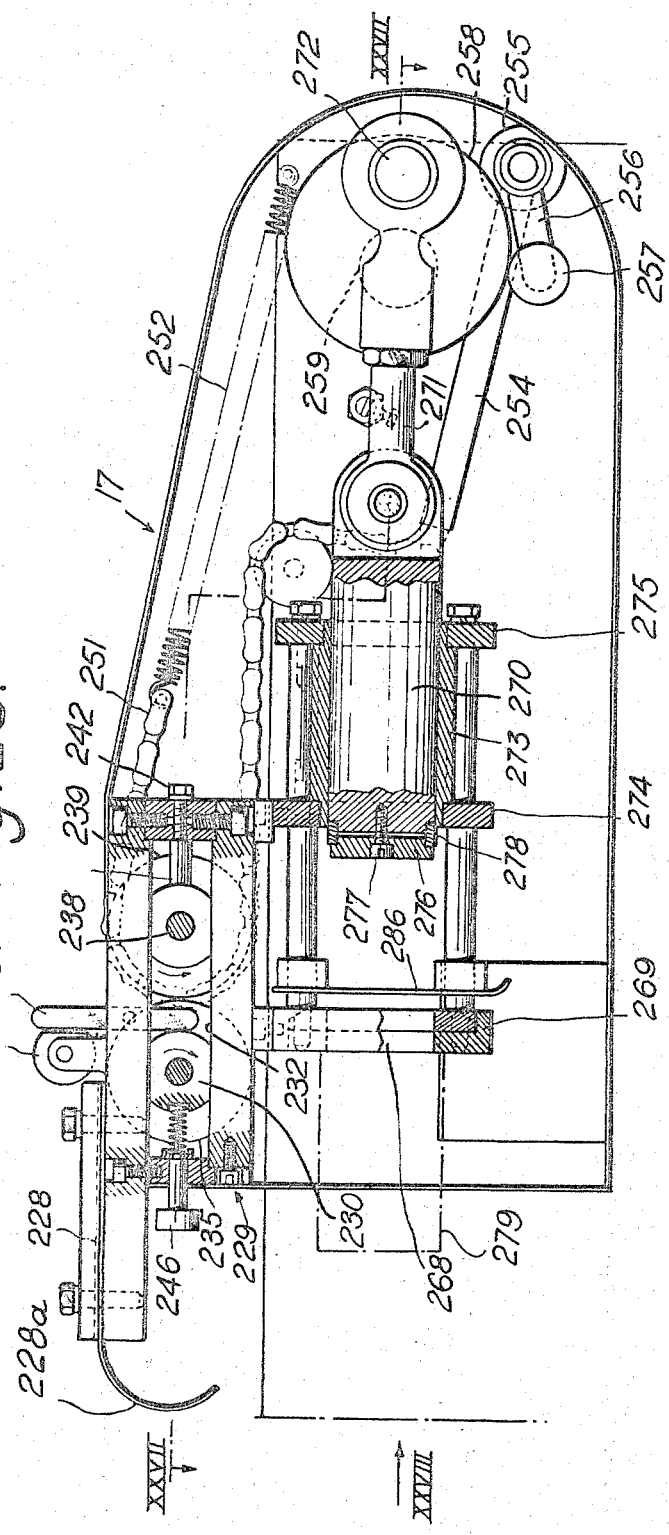

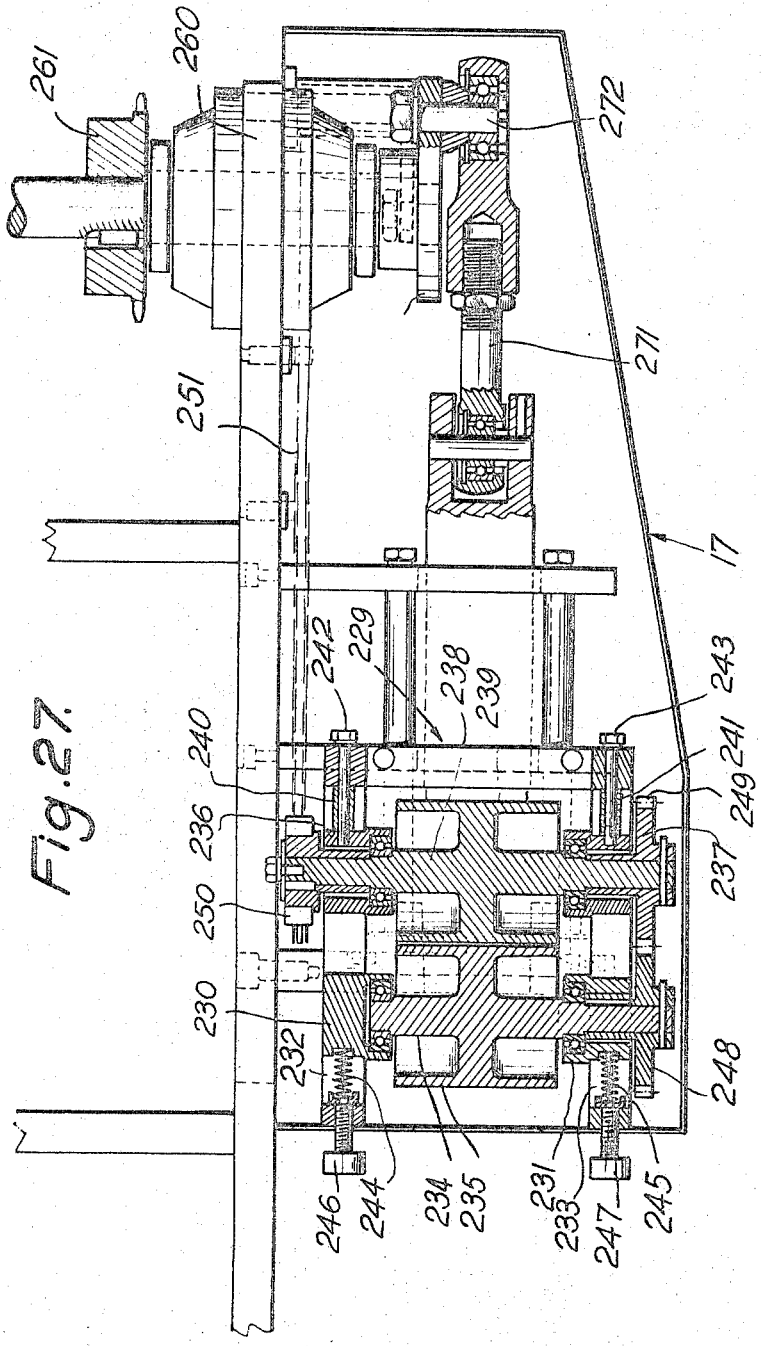

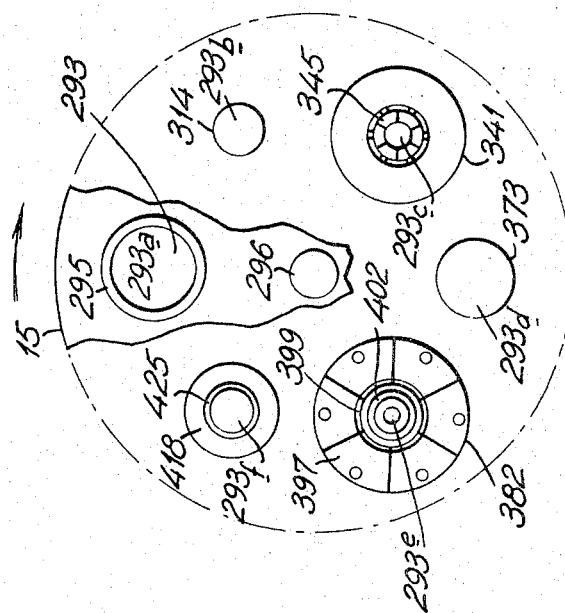
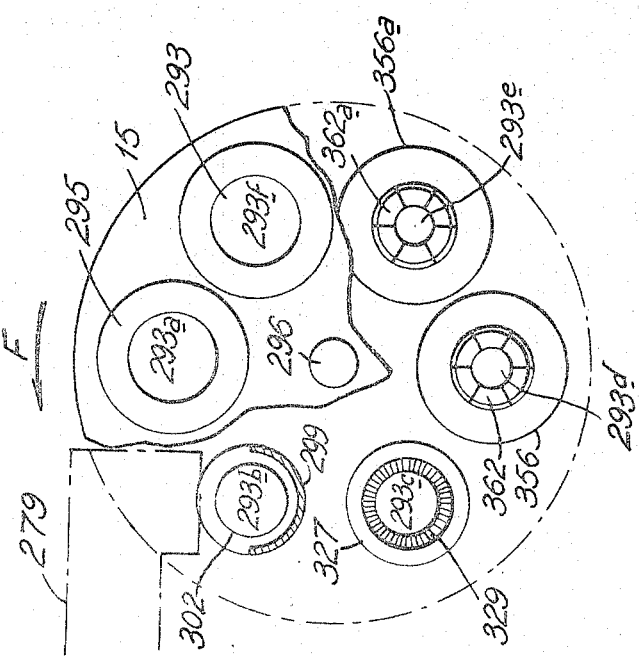

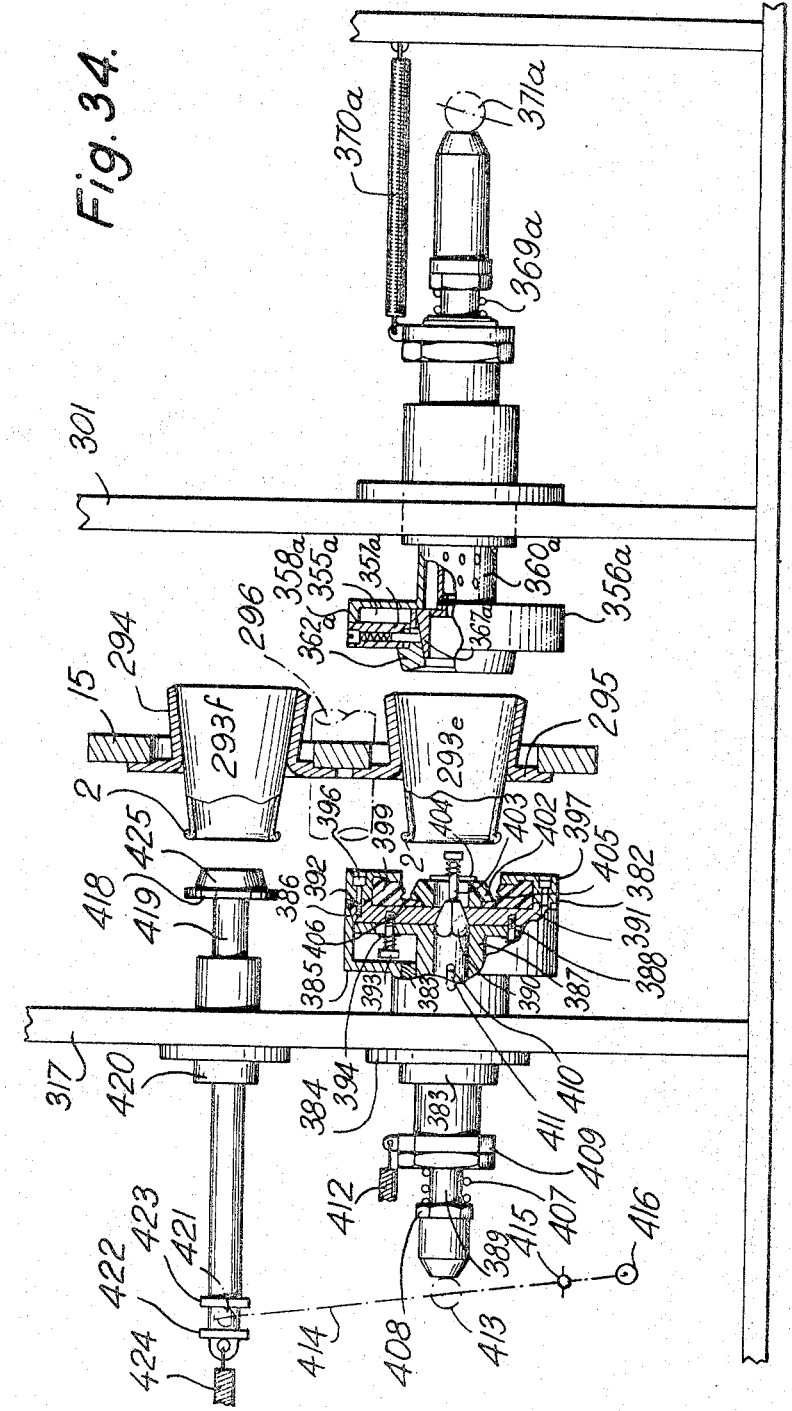

United States Patent Office 3,336,847
Patented Aug. 22, 1967

3,336,847
MACHINE FOR MANUFACTURING FRUSTO-CONICAL CONTAINERS MADE OF SHEET MATERIAL, AND MORE SPECIFICALLY YOGHURT POTS
Robert Georges Eugène Durat, Jouet-sur-l'Aubois, Cher, France
Filed Jan. 27, 1965, Ser. No. 428,297
Claims priority, application France, July 20, 1964, 982,239, Patent 1,420,397
31 Claims. (Cl. 93—39.3)

ABSTRACT OF THE DISCLOSURE

A machine for fabricating yoghurt pots, comprising a transfer device for the transfer of blanks to a bevel-cutter and a tool for forming a folded edge and then to a heat source. Thereafter the blanks are transferred to a station having a plurality of mandrels mounted on a stepwise-rotating revolver-head whereat the blanks are formed into frusto-conical sleeves. A second transfer device serves for the introduction, into sockets of a stepwise-rotating revolver-plate, of sleeves in which the larger base of each sleeve receives a pot bottom and the base is folded inwardly and crimped onto the bottom, the smaller base edge being rolled and the pots ejected into a distributor device which conveys them to a terminal heating station for finally bonding the bottoms to the inner wall of the sleeves.

---

This invention relates to a machine for manufacturing frusto-conical containers made of sheet material, and more particularly yoghurt pots made of cardboard of which the faces forming the internal walls of the container are previously thinly lined with a thermoplastic resin suitable for containing foodstuffs, a preferred example being polyethylene (hereinafter referred to as "polythene"), said containers being of the kind described in French Patent No. 1,402,124.

In what follows, for greater simplicity, the thermoplastic resin suitable for foodstuffs mentioned hereinabove will be referred to simply as "thermoplastic resin."

Such yoghurt pots are formed with an outwardly rolled edge around their smaller base and with a bottom which closes their larger base and is retained by an inward fold made on the cardboard blank which is rolled into frusto-conical shape and sealed down its side by coating its inner overlapping end-section with the same thermoplastic resin. This seal, together with the bond between the inner lateral surface of the bottom and said fold and between the outer lateral surface of the bottom and said frusto-conical blank, is effected by welding at a temperature and for a duration preventing any scorching of the cardboard along the welded areas, by applying a heat source maintaining a temperature of not more than 180° C. approximately in the polythene, for times lasting over one second.

Preferably, as described in copending U.S. Patent application Ser. No. 428,295, filed Jan. 27, 1965, now abandoned, by the applicant and entitled, "Method and Apparatus for Leaktightly Joining Materials in Sheet Form," the cardboard blank lined with a film of thermoplastic resin has a bevel cut made through the thickness of the cardboard alone, along its edge which is to form the inner overlapping portion of the seal down the side of the rolled-up blank, this edge being then folded back along the bevel cut, outwardly relative to the polythene lining, whereby to effect the seal by welding this folded-back portion to the inner lining of the outer portion of the seal which overlaps the folded-back bevel-cut edge.

The present invention has for main object to permit the manufacture of yoghurt pots of the kind hereinbefore disclosed and accordingly relates to a multiple-station machine comprising, in succession, a magazine containing cardboard blanks having their upper faces lined with polythene, which magazine is positioned at the entrance to a transfer station for fetching the blanks into position one by one with one of their edges before a bevel-cutter and a tool for forming the folded edge, and with their opposite edge beneath a heat source for melting the polythene, the blank shaped and heated thus reaching a frusto-conical sleeve-forming station having a plurality of mandrels mounted on a stepwise-rotating revolver-head, the fabricated sleeve being borne along by a second transfer device for introduction into a station for finishing the pots in one of a plurality of sockets of a multiple-socket revolver-plate which is rotated stepwise whereby to enable the sleeve to first receive across its larger base the container bottom fabricated at a bottom-fabricating station, followed by the operation of folding the larger base of the sleeve inwardly, of crimping this fold onto the rim-flange of the container bottom, of forming the rolled edge along the smaller base of the sleeve and of ejecting the pot thereby obtained into a distributor device which conveys it to a terminal heating station for finally bonding said container bottom to the inner wall of said sleeve.

The blank magazine consists of two plates of sheet metal which maintains the blanks lengthwise and widthwise, the blanks being stacked thereinto from above with their lined faces upwards, on constant-level lateral abutments and on points positioned beneath the blanks at the centers of their larger and smaller cutout radii to permit separation of the blanks.

The transfer station comprises a take-up arm equipped with suction cups and disposed beneath the magazine, the blank taken up by these suction cups being borne along by a reciprocating transfer device equipped with ratchets, a first set of ratchets being so arranged that the blank is fetched into the first working position with its edge to the right of the direction of transfer and parallel therewith, and a second set of ratchets causing the blank to slew in such manner that its left edge is fetched parallel with said direction, and a third set of ratchets fetching the blank over the centerline and conveying it to the sleeve-forming station.

In the first blank-position provided by the reciprocating transfer device, the right-hand edge of the blank undergoes a bevel-cut through the cardboard alone by means of a bevel-cutter, after the blank has been held in position by a presser, followed by a downward folding along the bevel-cut thus obtained, by means of a hot blade kept at controlled temperature which maintains the shape of the fold.

In the second position occupied by the blank responsively to the reciprocating transfer device, the left-hand edge of the blank passes beneath an infra-red heating system with "on-off" type temperature regulation by an optical pyrometer, for a time sufficient to melt the polythene without scorching the cardboard. This heating system consists of a quartz tube contained in an aluminum tube provided with holes which pass the radiation only level with the left-hand edge of the blank. This heating system is associated to means for pivoting it about its axis in order to direct its holes differently and thereby avoid igniting the blank when an accidental stoppage of the machine occurs.

The sleeve-forming station comprises a stepwise-rotated revolver-head conventionally equipped with four conical mandrels spaced 90° apart, one of the rotation steps causing one of these mandrels to be aligned with the axis of the transfer station and to be thereby positioned above a twin-shell system which makes up the transferred blank and wraps it about this mandrel, while a rubber presser flattens the overlapping edges of the blank after the shells have closed. The shell system includes a central part which is adapted to apply the middle of the blank against the lowermost generatrix of the mandrel and onto which are pivotally connected two shells, the left-hand one (relative to the direction of transfer) closing after the right-hand one whereby to apply the left-hand edge of the blank on which the polythene has been melted over the outward fold made along the right-hand edge of the already rolled-up blank. In the second and third positions of the mandrel (over which mandrel the blank conveyed by the transfer device has been rolled into sleeve form), a presser operates anew over the joint formed along the sleeve generatrix. In the fourth position of the mandrel, an ejecting device detaches the sleeve from the mandrel.

The second transfer station consists of endless belts driven continuously between two sleeve guides, whereby to receive the sleeve ejected from the sleeve-forming station and convey it to the pot-finishing station.

The pot-finishing station comprises a vertical revolver-plate with six sockets, driven stepwise in 60-degree steps, with two sockets centered upon a vertical axis in respect of any one step, the upper socket receiving, at the first position, a sleeve which is conveyed by the second transfer device with its larger base facing the latter. In the second position of the socket now carrying a sleeve, a container-bottom positioning device which receives the bottoms from a station for fabricating the same drives the bottom, with its frusto-conical flange, into the larger base of the sleeve up to a position leaving a projecting portion of the sleeve between the rim of the larger base thereof and the rim of said flange, the bottom being restrained during this operation by a thrust plate which passes through the smaller base of the sleeve. In the third position of the socket carrying a sleeve with a fitted bottom, a hot-folding device folds back the sleeve portion projecting between the larger base of the sleeve and the rim of the bottom-flange, inwardly toward said bottom, an expandable device with an oiling pad penetrating into the sleeve through its smaller base in order to oil that portion of the inner sleeve wall which is to form the rolled-down edge. In the fourth position of the socket, an expanding hot-crimping device applies the fold made round the larger base of the sleeve against the bottom-flange, the sleeve being supported over its smaller base by a supporting plate. In the fifth position of the socket, a second expanding hot-crimping device applies the sleeve fold against the bottom-flange, while the sleeve sustains over its smaller base the action of a rolled-edge-forming expanding device. In the sixth position, the finished pot has its rolled edge acted upon by an ejecting device which includes a central projecting portion that penetrates into the pot to hold it substantially in position.

The device for distributing the pots on exit from the revolver-plate is formed substantially as a pivoting basket formed by a plurality of fingers directed parallel to the pivoting axis and arranged along a circle eccentric thereto, with a passageway between two of these fingers sufficient to pass a finished pot. When ejection of a pot from the revolver-plate occurs, this passage is disposed in such manner that the pot is retained in the basket, the depositing of the pot on a guide ramp being effected by a pivotal motion of the basket in response to a roller engaged by the edge of the revolver-plate socket in the ejection position. A fixed finger cooperates with the basket fingers for guiding the ejected pot into the basket.

The terminal heating station disposed at the end of the distributor ramp includes an endless chain with pot-entraining pegs for rolling the pots along a guide before an infra-red tube positioned on the bottom-crimping side, in order to bond the outer surface of the bottom-flange to the inner surface of the sleeve. On issuing from the heating device the pot is entrained by an air jet, and any pots devoid of a bottom fall under gravity.

The container-bottom fabricating station consists of a horizontal press, and the polythene-lined cardboard issuing from a spool is pushed between a punch and a die by a system of rolls driven by free-wheels which are themselves driven by cams, the bottoms being transferred to the bottom-positioning device of the pot-finishing station and being turned over in the course of this transfer by means of a trough and a blower system. The bottom-fabricating station comprises a locking device for halting the advance of the cardboard when the revolver-head mandrel is devoid of a sleeve in the second position, this being done responsively to a microswitch operated by said mandrel devoid of a sleeve.

The waste obtained from cutting the straight edges of the blanks and from cutting out and swaging the bottoms are discharged by a continuously or intermittently operating air ejection system.

The invention additionally has for object to provide a yoghurt pot obtained by means of the machine described hereinabove.

The description which follows with reference to the accompanying non-limitative exemplary drawings will give a clear understanding of how the invention can be carried into practice.

In the drawings:

FIG. 1 shows in perspective a yoghurt pot fabricated by means of a machine according to the invention;

FIGS. 2 and 3 show two different blanks usable for fabricating the pot of FIG. 1;

FIG. 4 shows the method of joining the edges of the blank along the generatrix of the pot of FIG. 1;

FIG. 5 shows the method of bonding the bottom and the frusto-conical body of the pot of FIG. 1;

FIG. 6 shows the upper rolled edge of the pot of FIG. 1;

FIG. 11 is an overall view of the blank take-up device, of the first transfer device and of the reciprocating-movement-imparting system thereof;

FIG. 12 is a section on a greatly enlarged scale of a sheet of cardboard lined with polythene, taken through the edge which is to form the inner edge of the longitudinal joint down the side of the pot;

FIG. 13 shows the edge of the sheet of FIG. 12 subsequent to bevelling;

FIG. 14 shows the edge of the sheet of FIG. 13 subsequent to formation of the right-angled bend therein;

FIG. 15 is a schematic representation of the apparatus used for obtaining the beveled edge of FIG. 13;

FIG. 16 is a schematic representation of the apparatus used for obtaining the right-angled bend of FIG. 14;

FIG. 17 is a fragmental cross-sectional view of the first transfer device;

FIG. 18 is a schematic representation of the safety device applied to the infra-red tube for heating the left-hand edge of the blanks, in the event of an accidental stoppage of the machine;

FIG. 19 shows the set of jaws and the actuating means thereof;

FIG. 20 is a section taken through the line XX—XX of FIG. 9;

FIG. 21 is a partial view of the lower part of FIG. 20, as seen in a plane perpendicular to that of FIG. 20;

Figure 7:
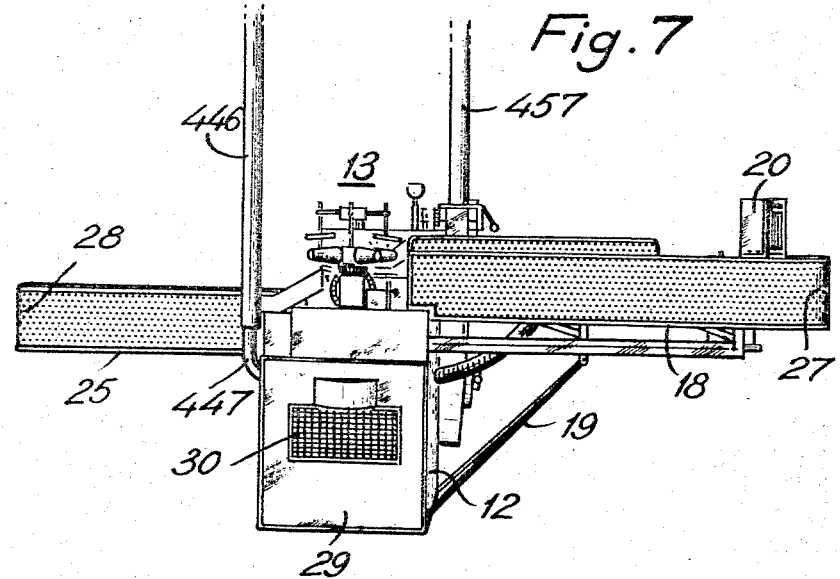
FIG. 7 is a right-hand side elevation of a machine with protective guards according to the invention for fabricating yoghurt pots.
Figure 8:
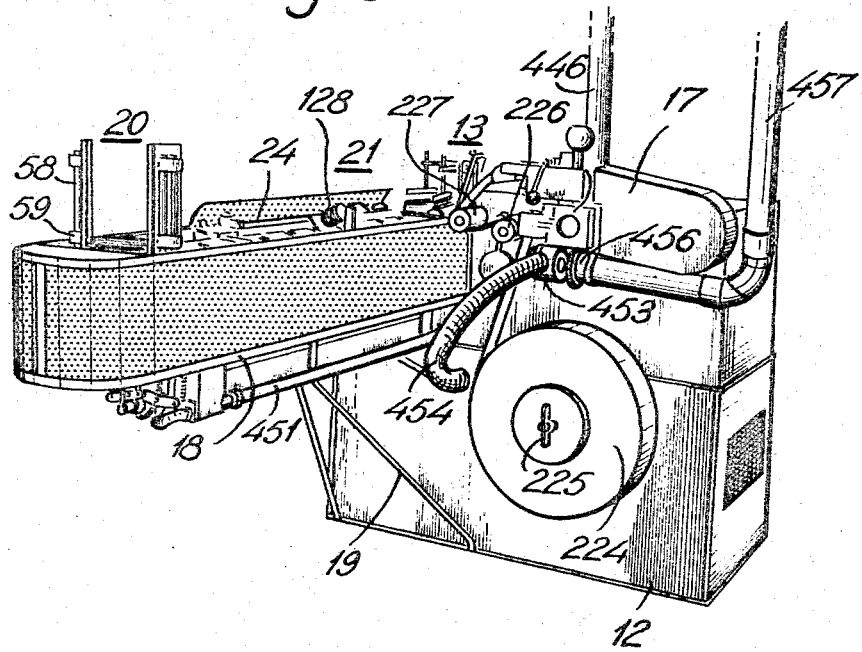
FIG. 8 is a rear three-quarter perspective view of the protected machine for fabricating yoghurt pots.
Figure 9:
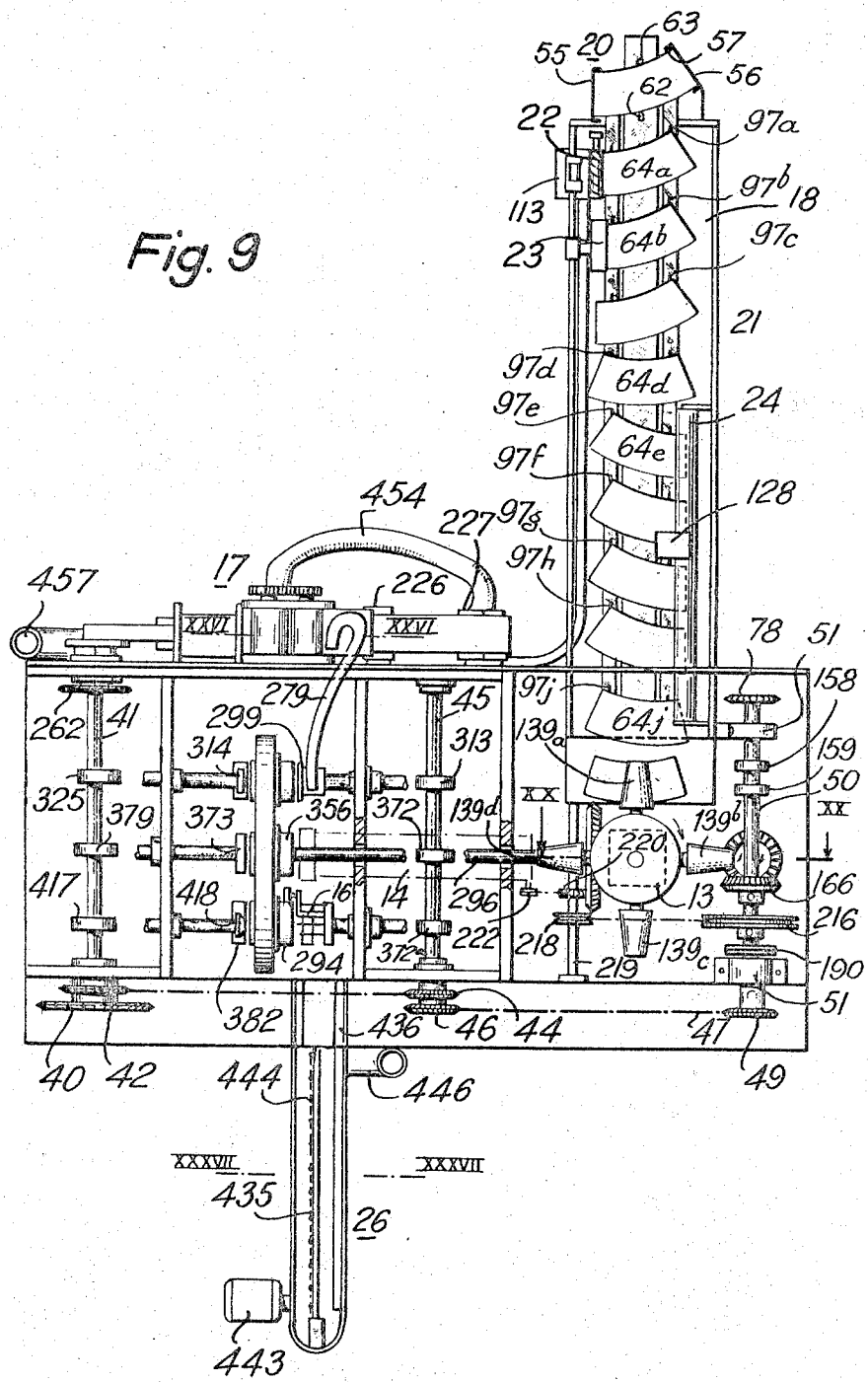
FIG. 9 is a schematic plan view of the machine of FIGS. 7 and 8, the guards having been removed.
Figure 10:
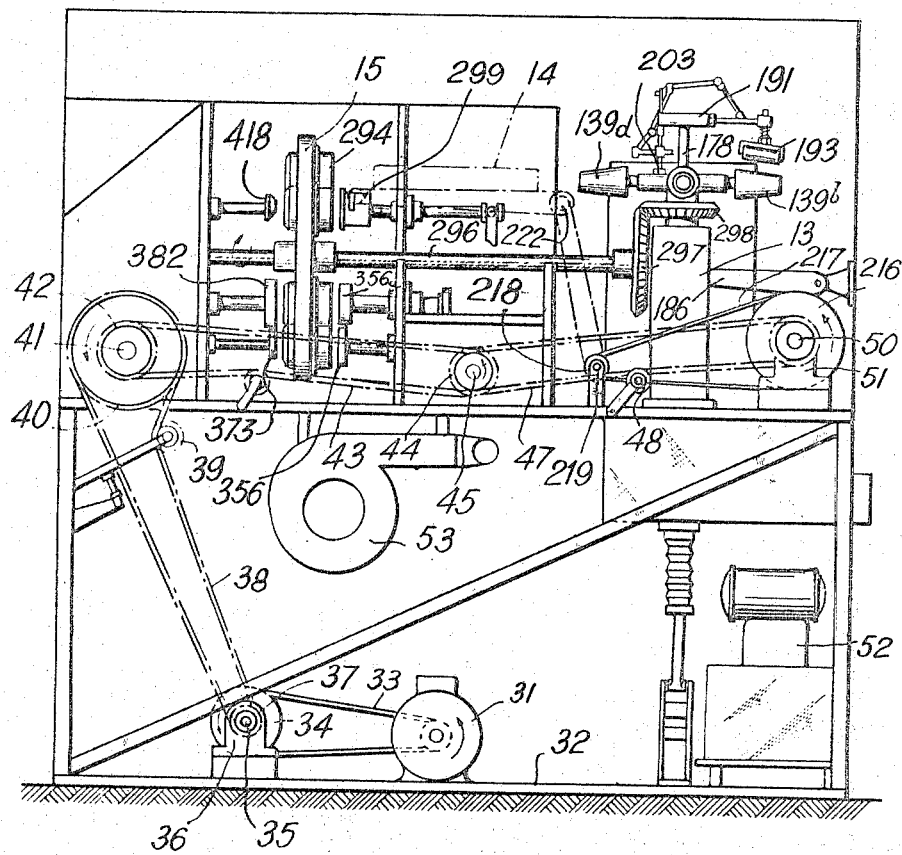
FIG. 10 is a front elevation view of the machine, the guards and the terminal heating device having been removed.
Figure 25:
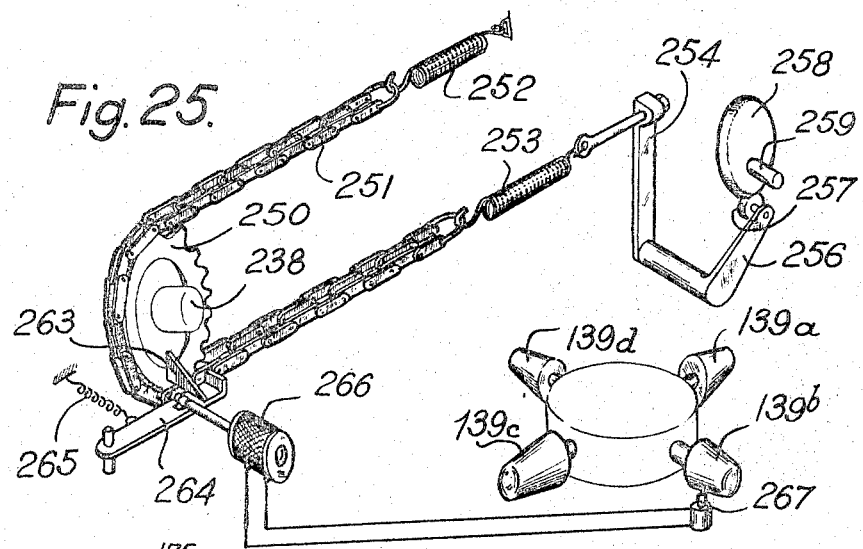
Figure 28:
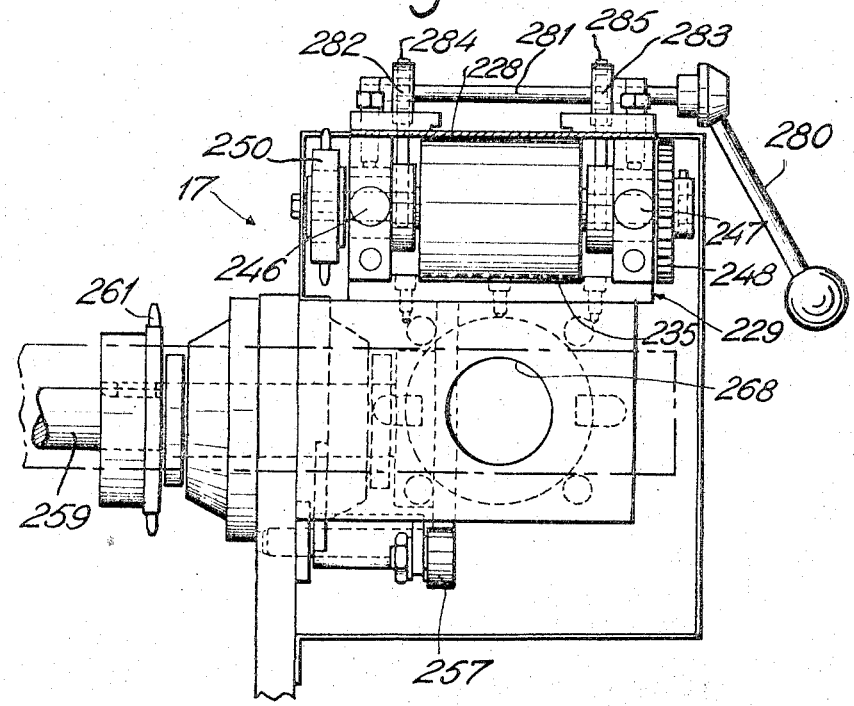
Figure 29:
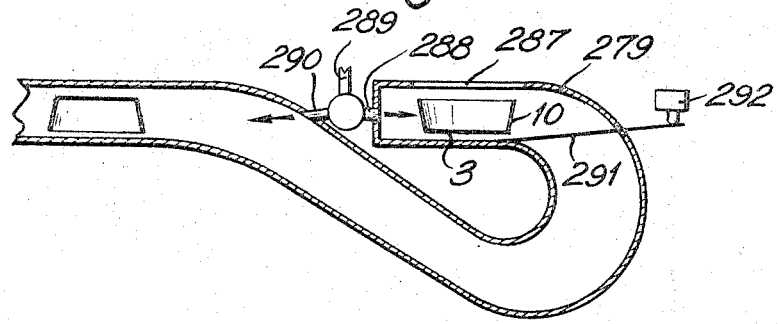
Figure 32:
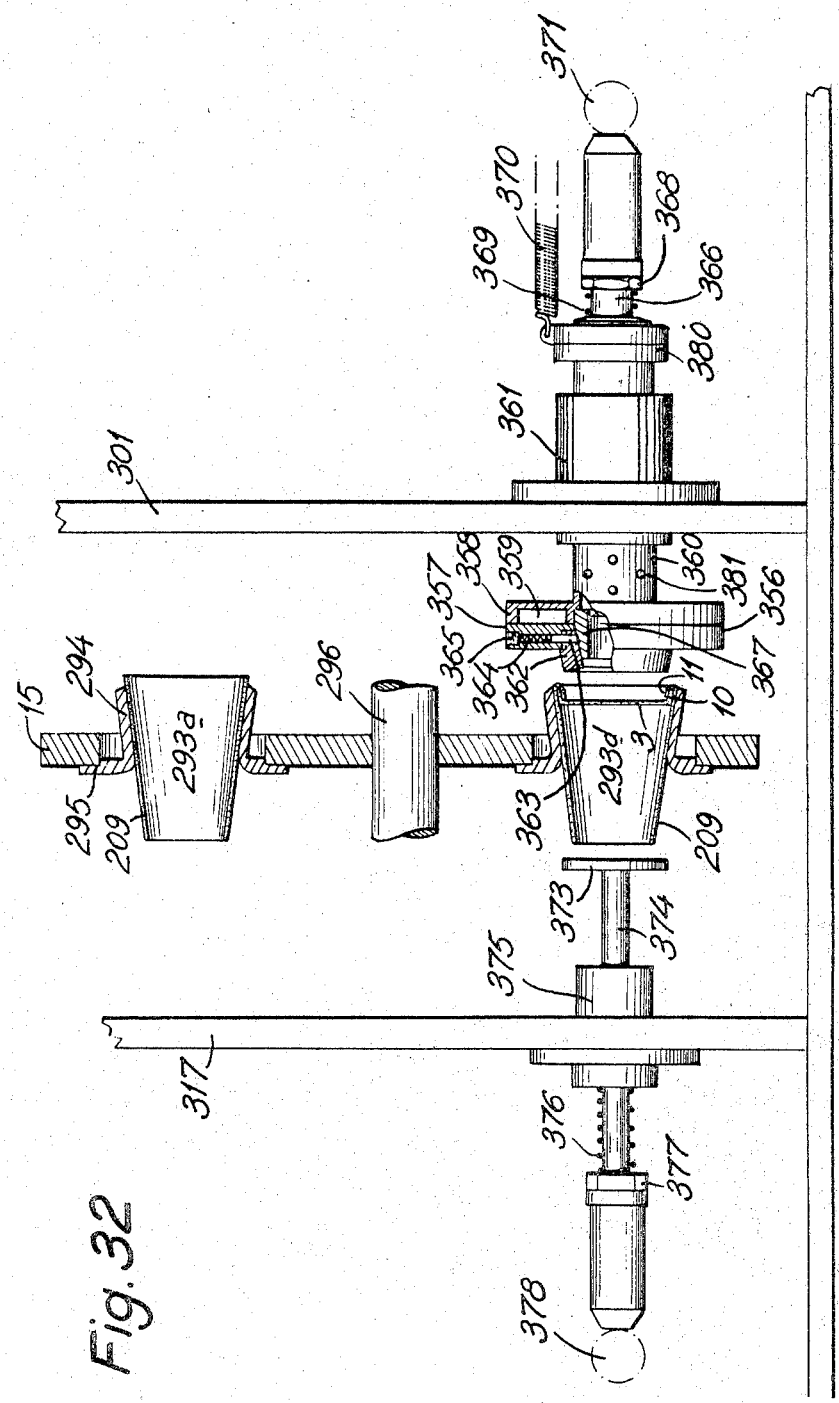
Figure 33:
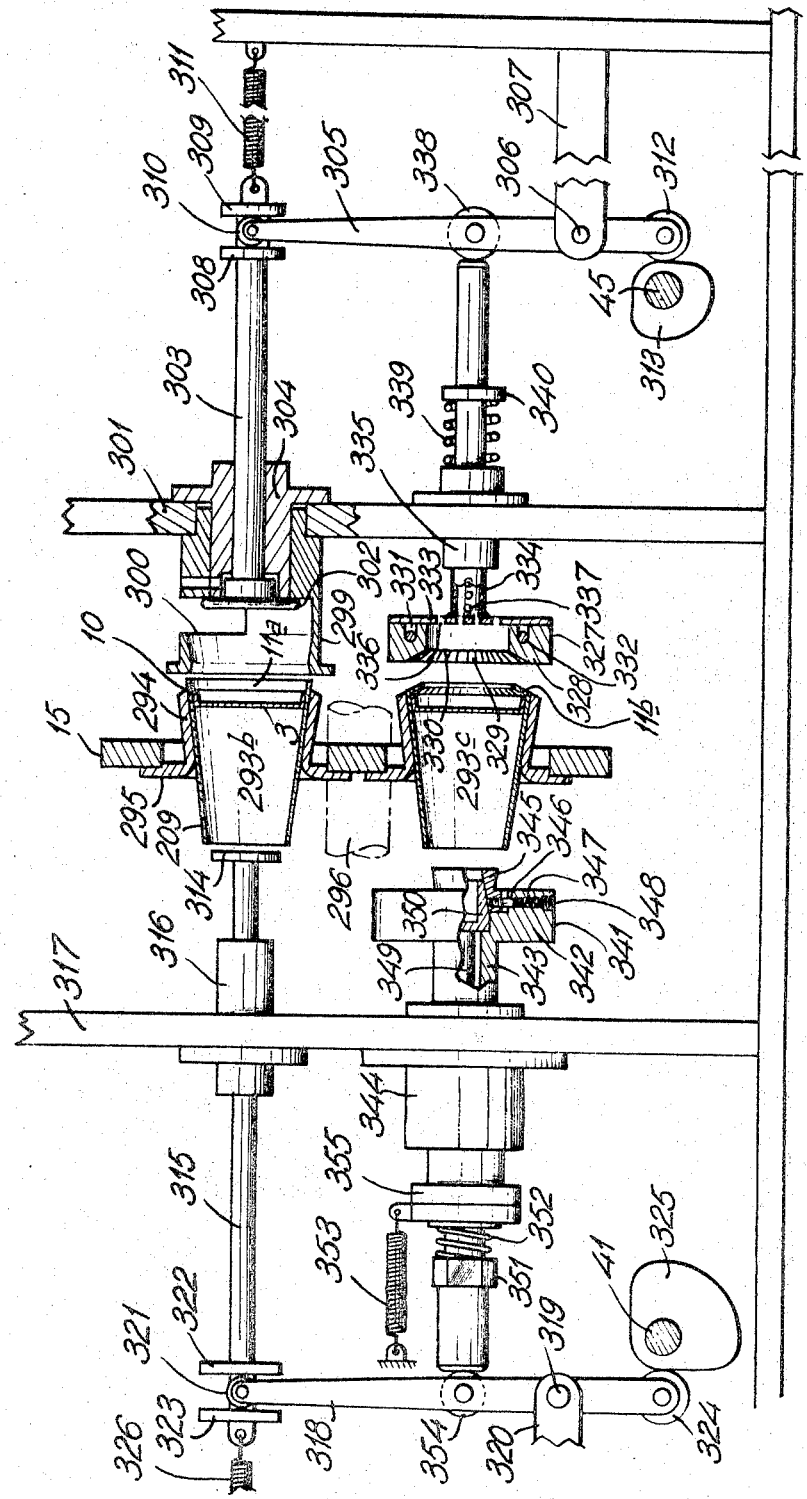
Figure 36:
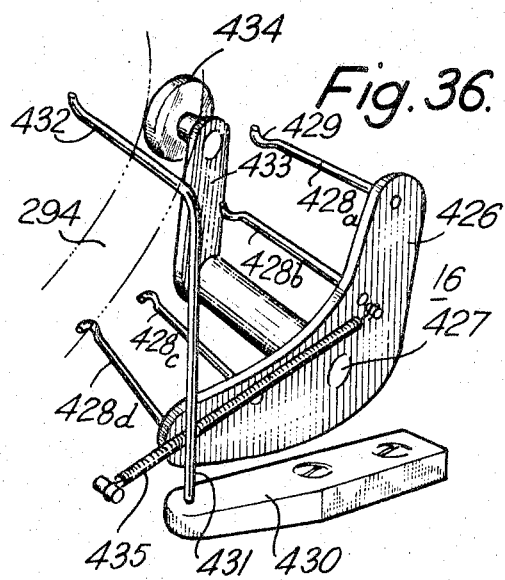
Figure 37:
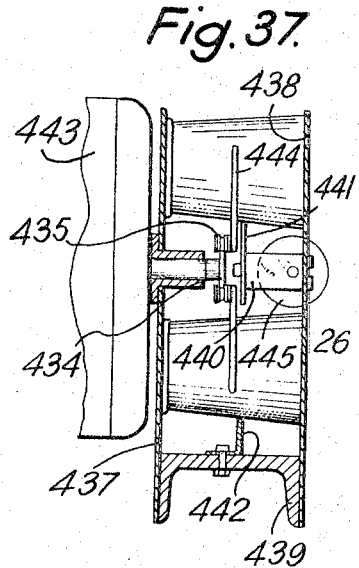
Figure 38:
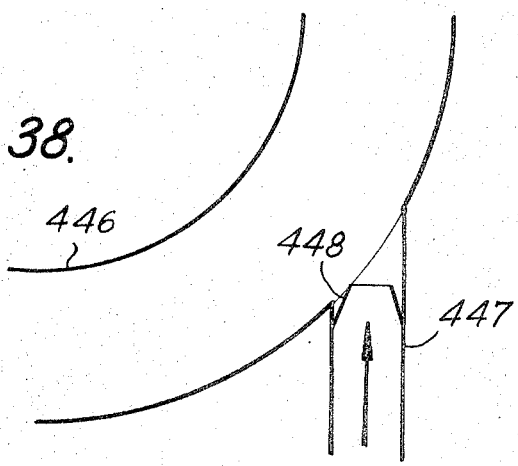
Figure 39:
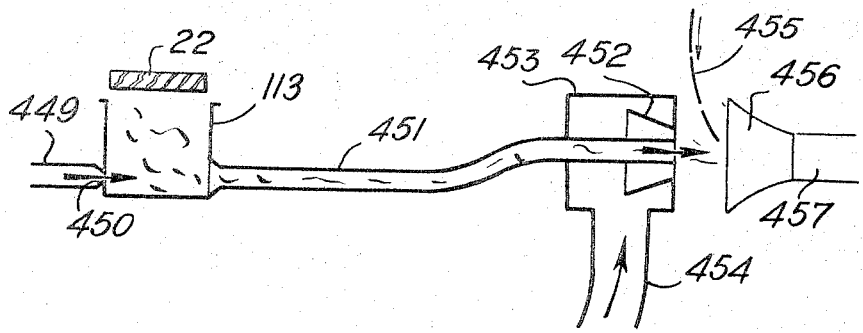

FIG. 25 schematically illustrates a system for locking the bottom swaging and cutting-out device;

FIG. 26 shows on an enlarged scale a vertical section of the bottom swaging and cutting-out apparatus, taken through the line XXVI—XXVI of FIG. 9;

FIG. 27 is a horizontal section through the bottom swaging and cutting-out apparatus, taken through the line XXVII—XXVII of FIG. 26;

FIG. 28 is a side elevation view of the bottom swaging and cutting apparatus, looking in the direction of the arrow XXVIII of FIG. 6;

FIG. 29 is a schematic illustration of the device for transferring the bottoms from the swaging and cutting-out apparatus to the station for positioning the bottoms on the revolver-plate, together with the safety system thereof;

FIG. 30 is a partial view of the revolver-plate, as seen from opposite the mandrel-bearing revolver-head, together with an end-view of the associated gear;

FIG. 31 is a partial view of the revolver-plate as seen from the mandrel-bearing revolver-head side, together with an end view of the associated gear;

FIG. 32 shows the revolver-plate and the associated tools used for the first and fourth positions of the socket;

FIG. 33 shows the revolver-plate and the associated tools used for the second and third positions of the socket;

FIG. 34 shows the revolver-plate and the associated tools used for the fifth and sixth positions of the socket;

FIG. 35 is a front elevation view of the jaw-bearing web of the rolled-edge forming apparatus, the three component parts of a jaw being shown placed in different positions;

FIG. 36 is a perspective view of the distributing basket receiving the pots ejected from the revolver-plate, together with the control means thereof;

FIG. 37 is a section taken through the line XXXVII—XXXVII of FIG. 9;

FIG. 38 schematically illustrates the method of discharging the finished pots; and FIG. 39 schematically illustrates the method of discharging the waste material obtained from cutting the blanks and the bottoms.

The subject machine of the invention permits the fabrication of a yoghurt pot of the kind shown in FIGS. 1 through 6. Such a pot comprises a frusto-conical sleeve 1 having a rolled edge 2 round its smaller base and a bottom 3 closing its larger base. The pot is made with cardboard lined with a thermoplastic material 4 such as polythene, provided as a thin layer on that face of the cardboard which, subsequent to cutting and shaping, is to form the inner surfaces of the pot in contact with the yoghurt.

In fabricating such a pot the side wall thereof is constituted from an annular sector-shaped blank 5 (FIG. 2) or 5a (FIG. 3) having adjacent the ends of its arc of smaller radius or over the entire length of that arc creases 8 or 8a for assisting in obtaining the rolled edge 2, more particularly over the portion where the straight edges 9, 9a of the blank overlap, in order to avoid tearing the cardboard during the rolling operation.

The bottom 3 is cut and swaged to provide it with a frusto-conical flange 10.

After the blank has been rolled up, the joint between the edges 9 and 9a is obtained, as will be described hereinbelow, in such manner that the end-section of the edge 9a (inner edge of the joint) is covered by the film of polythene and thereby rendered leaktight. Similarly, in order to ensure absolute leaktightness of the pot, the blank rolled into sleeve shape has the rim of its larger base folded back as at 11 whereby to hug the flange 10, the latter being welded both to this fold 11 and to the inner wall of the body portion 1.

In the form of embodiment shown in FIGS. 7 through 10, the machine for fabricating the yoghurt pot comprises a central case 12 containing all the drive mechanisms of the various tools to be described hereinafter, and this case directly supports the mandrel-bearing revolver-head 13, the second transfer device 14, the revolver-plate 15, the distributor 16 and the bottom-fabricating apparatus 17. On an outrigger platform 18 positioned behind the case 12 and supported by struts 19, are mounted the blank magazine 20, the first transfer device 21 with the cutter 22, the folder 23 and the heating device 24. A second outrigger platform 25 positioned in front of the case 12 contains the terminal device 26 for heating the finished pots around their bottoms. The mechanisms mounted on the outrigger platforms 18 and 25 are contained as a safety measure in grid-type enclosures 27 and 28. A lateral door 29 positioned on the right-hand side of the machine and fitted with a grid 30 provides access to the electrical and electronic control gear housed in the case 12.

The various drives to the machine tools are transmitted from a motor 31 fixed to the base of the chassis 32 of the central case 12. Through a belt 33 this motor drives a pulley 34 mounted on a shaft 35 which is supported in bearings 36 and to which is keyed a sprocket wheel 37 which, through a chain 38 with an adjustable tensioning roller 39, drives a sprocket 40 mounted on a shaft 41, which shaft is the first camshaft driving the bottom-swaging and cutting out device. Onto the shaft 41 is keyed a second sprocket 42 which, through a chain 43, drives a sprocket 44 mounted on a cross-shaft 45 constituting the second camshaft. A second sprocket 46 keyed to the shaft 45 drives, through a chain 47 with tensioning roller 48, a sprocket 49 supported on a shaft 50 carried in bearings 51, which shaft is the third camshaft for driving the transfer devices, for operating the jaws which wrap the blank around the mandrel in the first position, and for rotating the mandrel-bearing revolver-head 13 and the revolver-plate 15 stepwise. Additionally mounted on the chassis 32 is a suction pump 52 and an exhauster 53 the functions of which will be explained hereinafter.

The blank magazine 20 is mounted on the right-hand side of the platform 18 with respect to the direction of transfer. This magazine, which is braced by a support 54, comprises two uprights 55 and 56 (FIGS. 9 and 11) consisting of sheet-metal plates formed with right-angled bends 57 which, for each plate, are spaced from each other by a distance slightly greater than the length of the straight side of the blank. The upright 55, which is the right-hand upright with respect to the direction of transfer, is arranged parallel with that direction. The two uprights are fixed onto supports 54 by any convenient means such as columns 58 on which they may be adjusted vertically, and these columns have their bases supported by parts 59 pivotally connected to the support 54 to enable the orientation of the uprights to be adjusted according to the size and configuration of the blanks.

The previously printed and cut-out blanks are loaded into the magazine from above and descend under gravity between the guiding uprights 55 and 56. Their upper face is covered with polythene and their circuit arcuate edge of larger radius is turned into the direction of transfer. Beneath the stack of blanks are disposed lateral stops for maintaining a constant bottom stack level. These stops are small balls 60 mounted on spindles 61. Points 62 and 63 positioned beneath the bottommost blank in the stack, at the center of its larger and smaller cut-out radii, permits separation of the blanks by extracting the bottommost blank 64, such extraction being effected with out friction by reason of the presence of the balls 60.

Beneath the magazine 20 (see FIG. 11) is disposed a take-up arm 65 comprising two tubes 66 and 67 equipped with rubber suction cups 68 and 69 adapted to be evacuated through two pipes 70 and 71 connected to a small valve 72 which is controlled by a catch 73 rigid with the arm 65 and which is in turn connected through a pipe 74 to the suction pump 52. The arm 65 is linked through an eccentric-type transmission 75 to a shaft 76 supporting on its end a sprocket 77 which is driven by a chain (not shown) off a sprocket 78 supported on the third camshaft 50.

When, responsively to the transmission 75, the take-up arm 65 rises, the tubes 66 and 67 with their suction cups are guided through tubular guides 79 and 80 fixed to the platform 18, and after the catch 73 has released the valve 72 air is sucked through the suction cups 68 and 69 which are then applied underneath the bottommost blank 64. As they redescend these suction cups withdraw the bottommost blank from the stack, and when the catch 73 operates on the valve 72, the blank is released by the suction cups due to the air suction effect having ceased. The blank is then deposited on the upper face 81 of the platform 18. The blank is then displaced stepwise over this upper face responsively to the means described hereinbelow.

On the end of the shaft 76 is mounted a plate 82 bearing an eccentric pin 83 to which is connected through a ball-joint 84 a link 85 supporting on its other end a ball bearing 86 onto which is pivotally connected a link 87 connected through two further links 88 and 89 to a pin 90 which is movable through slots 91 formed in the vertical faces of a fixed tube 92 (see FIG. 17) of square cross-section which forms part of the platform 18 and along which the blanks move. Along the length of the tube 92 is formed therein a set of slots 91 equal in number to the number of positions which the blank must occupy in its stepwise movement responsively to the transfer device. Through each such slot is movable a pin similar to the pin 90.

Each of these pins 90 moves through the correponding slot 91 under the guidance of rollers 93 and has its extremities fixed to the vertical flanges of two angle-irons 94 and 95 positioned on either side of the tube 92 with their upper flanges level with the upper face of the tube. These angle-irons are thus driven in reciprocating motion parallel to the slots 91. The upper flanges of the angle-irons have formed therein slots 96 through which are movable upwardly spring-loaded ratchet levers 97 pivotally connected at 98 to said angle-irons. In addition, on the upper face of the fixed tube 92 are mounted, correspondingly with each pair of ratchet levers 97, pins 99 which are supported by supports 100 and which are rigid with arms 101 inclined in the direction of the transfer motion, as shown in FIG. 11. These pins additionally support pressing members 102 operating by gravity.

When the angle-irons 94 and 95 are driven in the direction of the magazine 20, the ratchet levers 97 retract as they pass beneath the blanks, and then rise once more into the position of FIG. 11 responsively to their associated springs (not shown). The positions of the ratchet levers in each pair thereof with respect to the transfer axis, is determined so as to position the blank as desired. At the same time, as the angle-irons draw back, the arms 101 assume positions corresponding to the disposition of the larger circular arc of the blank, whereby to keep the blank pressed against the corresponding ratchet levers, this pressure being supplemented by the influence of the pressers 102. When the angle-irons are moved towards the revolver-head, the arms 101 pass over the blank, which is then being conveyed by the ratchet levers. It should be noted that the arms 101 have been omitted from FIG. 9 for greater simplicity.

The first ratchet levers 97a (see FIG. 9) are so arranged that the blank 64 extracted from the magazine 20 with its straight edge 9a parallel with the direction of transfer remains in that position and is conveyed beneath the cutter 22. Before the cutter operates, the edge of the blank is as shown in FIG. 12 and consists of the sheet of cardboard 103 covered with its polythene film 104. In order to obtain the lap-joint shown in FIG. 4, the right-hand edge of the blank 103 must be formed with a bevel 105 extending only through the thickness of the cardboard. This operation is done by the cutter 22 which is associated to a blank-restraining device comprising a presser 106 made of a flexible material such as natural or synthetic rubber, carried by a lever 107 pivotally connected to a fixed pin 108 on the platform 18, which pin has rigidly mounted thereon a thrust piece 109 through which extend one or more screws 110 screwed into the lever 107 with an interposed return spring 111 for providing the force applying the presser 106 against the blank. A blade 112 serves to clean the cutter 22, while the waste cardboard drops into a receptacle 113.

After the bevel 105 has been cut, the blank is conveyed by the ratchet levers 97b into the position 64b beneath the folding device 23. As is clearly shown in FIG. 16, this device includes a lever 114 which is pivotally connected to the same pin 108 as the pressing lever 107 and supports a pivotally mounted arm 117 onto which is pivoted a slide 118 cooperating with a slideway 119 positioned above the blank 64b. The slide 118 carries on its extremities a part 120 having a right-angled arm 121 terminating in a chamfer 122 level with the bevelled edge of the blank. When the lever 114 is brought from position B to position C, the chamfer 122 meets the bevel 105 and bends its substantially at right angles, away from the polythene lining 104 (see FIG. 14). At the same time, a temperature-controlled heating blade 123 penetrates into the fold formed thus and eliminates the elasticity of the lining 104 over the area of this fold, by shaping it rigidly as at 124 in FIG. 14.

The cutter 22 is rotated by a chain transmission off a sprocket 125 mounted on the shaft 76 (FIG. 11). The levers 107 and 114 and the heating blade 123 are coupled to the shaft 76 by a transmission system (not shown) actuated by a cam 126 supported on said shaft.

The blank with its folded straight edge 9a is then fetched by the ratchet levers 97c and 97d into a position 64d in which it is aligned upon the transfer centerline. The ratchet levers 97e then fetch it into a position 64e in which its left-hand edge 9 is disposed parallel to the transfer direction. In this and the subsequent positions, in which the inclination of the blank relative to the transfer direction remains unchanged, the left-hand edge moves beneath the heating device 24. The latter comprises an infra-red radiation quartz tube 127 the temperature of which is rapidly regulated on the on/off principle by an optical pyrometer 128, for a time sufficient to melt the polythene without scorching the cardboard. In practice, the heating time is of the order of seven seconds. The lower face of the blank beneath its left-hand edge is supported by a Teflon wire. The tube 127 is enclosed in an aluminum tube 129 provided with openings 130 for passing the radiation of the tube 127 only over that width along the left-hand edge of the blank which is to be subsequently used for the joint down the side of the sleeve.

In order to prevent the blank from igniting through the openings 130 being maintained in their heating position after an accidental stoppage of the machine, the tube 129 carries a catch 131 connected through a return spring 132 to the wall of the machine. An electromagnet 133 cooperates with a plunger 134 which latches the catch 131 against the countering effect of spring 132. This plunger is extended by a ramp 135 and a straight portion 136 parallel with itself. In the event of the accidental machine stoppage, the electromagnet 133 is energized and its plunger 134 is thereby attracted and releases the locked catch 131 which, under the urge of the spring 132, causes the tube 129 to pivot about its axis and deflect the openings 130 angularly away from the blank. When the machine is restarted, the electromagnet 133 is deenergized and its plunger, responsively to the return spring 137, locks the catch 131 against the countering spring 132, through the agency of the plunger portion 136 and ramp 135, thereby correctly positioning the openings 130 above the left-hand edge of the blank.

Subsequent to the operation of the heating device 24, the ratchet levers 97j re-align the blank on the position 64j over the transfer centerline. The blank is then conveyed over a ramp 138 into a position opposite the jaw-type device adapted to wrap it around the mandrel 139 positioned coaxially with the transfer device in the position 139a.

As shown in FIG. 19, the jaw-equipped device includes a movable body portion 140 terminating in two arms 141 and 142 having a terminal surface matching the lateral surface of the mandrel 139. The body 140 is guided in a support 143 fixed to the base of the revolver-head and is spring-loaded by a spring 144 housed in the support 143 and bearing beneath a mounting plate 145 rigid with the body 140. Onto the arms 141 and 142 are respectively pivotally connected two jaws 146 and 147 of shape matching the mandrel 139. The position of these jaws relative to the body 140 can be adjusted by screws 148 carried by the mounting plate 145.

Pivotally dependent from these jaws are two rods 149 and 150 pivotally connected at their other ends to levers 151 and 152 respectively, which levers are fulcrumed on a support 153 about pins 154 and 155. These levers bear followers 156 and 157 which ride over control cams 158 and 159 carried by the third camshaft 50. The levers 151 and 152 are biased by return springs 160 and 161 which urge them against the cams 158 and 159, whereby the jaws are closed responsively to said springs and opened responsively to said cams. In order to prevent the marginal portions of the blank from overlapping haphazardly, the profile of cam 158 is devised in such manner that the jaw 146 which is to fold the blank portion heated marginally by the device 24 closes after the jaw 147 which is to fold back the blank portion whose bevelled edge has been folded by the device 23.

The angular settings of the cams 158 and 159 on the shaft 50 are so determined that when a blank is fetched beneath the mandrel 139 in the position 139a, the followers 156 and 157 ride off the cam lobes. In response to the spring 144, the arms 141 and 142 flatten the central portion of the blank beneath the lowermost generatrix of the mandrel 139, following which the jaws 146 and 147 close, with jaw 146 lagging behind jaw 147. When the follower 157 rides off the cam, the jaw 147 initially folds the right-hand portion of the blank 64 with its outwardly-folded bevel-cut 124. The jaw 146 then coacts with the mandrel to shape the left-hand portion of this blank, the border 64a of which bears the molten polythene, and applies this border 64a against the fold 124 responsively to a pressing device to be described hereinbelow. When closed, the jaws 146 and 147 leave a space therebetween, and the portion of mandrel surface registering with this gap is not flat as in conventional mandrels but forms a cylindrical bearing surface parallel with the mandrel generatrix, as shown at 161 in FIG. 18.

The mandrel 139 against which the jaws 146 and 147 have applied the blank 64 is one of four identical mandrels mounted on the revolver-head 13 which is rotated stepwise in 90-degree steps. The frusto-conical mandrels are fixed horizontally on a mandrel-carrier 162 (FIG. 20) rigidly connected to the upper end of a vertical tubular shaft 163 which rotates in ball bearings located at the head and foot of a column 164 fixed to the machine platen. These mandrels are hollowed out in order to reduce their weight and obtain a greater cooling area.

The tubular shaft 163 is rotated stepwise by a cam mechanism 165 driven by a bevel pinion 166 which is keyed to the third camshaft 50 and meshes with another bevel pinion 167 fixed to the top of a vertical shaft 168 rotating in two ball-bearings mounted in housings 169 and 170 fixed to the machine platen. This shaft 168 is the input shaft of the cam machanism 165.

Figure 23:
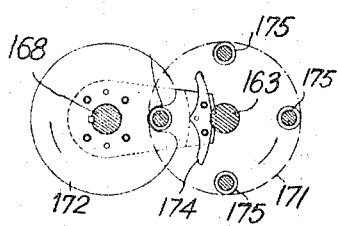
FIG. 23 is a section on an enlarged scale taken through the line XXIII—XXIII of FIG. 20.
Figure 22:
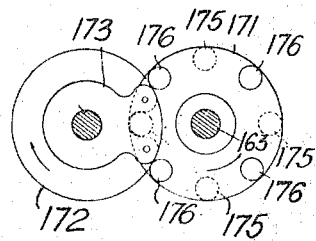
FIG. 22 is a section on an enlarged scale taken through the line XXII—XXII of FIG. 20.

The cam mechanism 165 (see FIGS. 20, 22 and 23) comprises a plate 171 rigid with the shaft 164, a main cam 172, a counter-cam 173 and a transition cam 174, these three cams being rigid with the shaft 168. The plate 171 carries eight followers arranged alternately on its two faces, to wit four followers 175 on its lower face for engagement by the main cam 172 and four followers 176 on its upper face for engagement by the counter-cam 173. The whole mechanism operates in an oil bath contained in a case 177.

The cam contours are so determined that each revolution of the continuously rotating shaft 168 causes the shaft 163 to be rotated through a quarter of a revolution in frictionless manner, with progressive accelerations and decelerations. These cams additionally ensure positive locking of the shaft 163 between consecutive angular shifts thereof.

A large vertical rod 178 is slidable through the tubular shaft 163. The bottom end of this rod pivots about a pin 179 fitted across two yoke-forming plates 180, and the other ends of these plates are pivotally connected at 181 to a beam-lever 182 fulcrumed about a pin 183 mounted in a yoke-like support 184 fixed to the machine platen. The other end of beam lever 182 is pivotally connected to an adjustable link 185 the upper end of which is connected to a lever 186 which is in turn pivotally connected to a support 188 fixed to the machine platen. This lever 186 carries a follower 189 riding over a cam 190 mounted on the third camshaft 50. A spring 187 connecting the link 185 to the machine platen spring-loads the follower 189 against the cam 190. The rod 178 is consequently possessed of a reciprocating up-and-down movement through the hollow shaft 163.

The rod 178 supports at its top a plate 191 into which is fixed, above the positions 139a, 139b and 139c successively occupied by each mandrel 139, a rod 192 supporting a presser 193 which is equipped with a block 194 of flexible material such as natural or synthetic rubber and which is slidable through the head 195 of the rod 192 against or under the urge of a spring 196. Responsively to the cam 190, the three pressers formed thus are applied against the uppermost generatrix of the mandrels in the positions 139a, 139b and 139c when the rod 178 descends, whereby to ensure good adhesion between the edges 9a and 9 of the blank rolled into sleeve form.

The rod 192 of the presser corresponding to position 139b has pivotally connected thereto a link 197 the other end of which is pivotally connected to an arm 198 carried by a pin 199 mounted at the top of a vertical rod 200. About the pin 199 pivot arms 201 onto the ends of which are pivotally connected two links 202 carrying a pusher 203 which is rigid with a rod 204 sliding through a guide 205 placed at the extremity of the vertical rod 200, which rod is itself slidable through a guide 206 rigid with the plate 191. A spring 207 biases the rod 200 downwardly relative to the plate 191. The lower end of the rod 200 is equipped with an adjustable screw 208 whose head is adapted to rest upon the flat upper face of the mandrel-carrier 162. This screw is adjusted in such manner that the pusher 203 is exactly flush with the upper cylindrical surface of the mandrel. The direction in which the rod 204 is guided through the guide 105 is parallel with this cylindrical mandrel surface.

When the plate 191 is in its uppermost position, the lower end of the sliding rod 200 is spaced from the mandrel-carrier 162, and similarly the pusher 203 is spaced above the cylindrical mandrel surface. When the plate 191 descends with the presser blocks 193, the complete mechanism just described descends with it and applies the screw 208 against the mandrel-carrier 162. This prevents the vertical rod 200 from descending further, but the compound is adjusted in such manner that the plate 191 descends a little further, thereby causing the levers 201 to pivot through a certain angle under the pull exerted by the link in the direction of arrow f, thus shifting the sliding rod 204 and hence the pusher 203 toward the right. The pusher therefore thrusts before it the sleeve 209 which was on the mandrel 139 in position 139d. When the plate 191 rises, the same motions occur in reverse.

Figure 24:
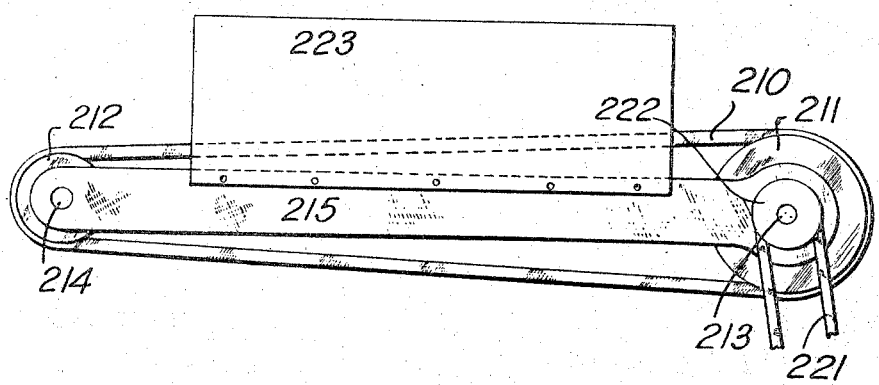
FIG. 24 is a front-elevation view on an enlarged scale of the second transfer device.

The sleeve 209 ejected thus falls onto the upstream end of the second transfer device 14. This second transfer device (see FIG. 24) consists of two endless Vee-belts 210 running over two compound pulleys 211 and 212 respectively mounted on shafts 213 and 214 carried in a support 215 rigid with the machine stand.

This conveyor system is positioned on the longitudinal vertical centerplane of the machine. It is operated by a transmission mechanism comprising a pulley 216 fixed to the third camshaft 50 and over which runs a Vee-belt 217 driving a pulley 218 fixed to an intermediate shaft 219 carrying a further pulley 220 which, through a belt 221, drives a pulley 222 fixed to the end of the shaft 213. Two lateral guides 223 rigid with the support 215 prevent the sleeves from falling sideways as they are conveyed along the belts 210.

The bottom swaging and cutting station 17 includes a large roll 224 (see FIG. 8) of strip-cardboard lined with polythene over its outer surface, the width of this strip being equal to or slightly greater than the diameter of a circular blank required to fabricate a bottom 3. This roll is formed on a hub slipped losely over a shaft fixed to the rear part of the machine structure and terminating in a pivoting linchpin 225, which prevents the roll from dropping off the shaft once it has been fitted. As it is drawn off the roll, the cardboard strip runs over intermediate rolls 226, 227, and then over a table 228 (see FIGS. 26 and 28) having a rounded leading edge as at 228a and which is located at the top of a block generally designated by the numeral 229 and secured to the rear vertical wall of the machine.

Two housings 230 and 231 mounted respectively in slideways 232 and 233 of the block 229 support two ball-bearings carrying the ends of the shaft 234 of a first cylinder 235; similarly, two other housings 236 and 237 support two other ball-bearings supporting the ends of the shaft 238 of a second cylinder 239 of same diameter as the cylinder 235. The positions of the two latter housings in their slideways is precisely determined against two distance-tubes 240, 241, respectively threaded over two studs 242, 243 which are inserted into the block 229 and the ends of which are screwed into said housings. The other two housings 230, 231 are urged toward the housings 236, 237 by two springs 244, 245 the pressure of which is adjustable by means of two adjustment screws 246 and 247 mounted in said block. The two cylinders are thus applied against each other, and the cardboard strip passing over the top of the table 228 then descends between these two cylinders.

The two cylinders 235 and 239 respectively carry two meshing gearwheels 248, 249 the pitch diameters of which are equal to the common diameter of these two cylinders. The cylinder 235 is driven by the cylinder 239, and the latter is driven intermittently in the direction of the arrow in FIG. 26 by a mechanism comprising a freewheel 250 of any convenient type mounted on the end of the shaft 238 and over which runs a chain 251, one end of which is attached to a spring 252 anchored to the machine wall (see FIGS. 25 and 26). The other end of the chain 251 is connected through a spring 253 to the end of a rocking lever 254 rigidly connected to a bush 255 bearing a further lever 256 which carries a follower 257 cooperating with a cam 258 consisting of an eccentric rigid with a shaft 259 which is continuously rotated in a fixed bearing 260 (see FIG. 27) by a sprocket wheel 261 mounted on that shaft and coupled to a sprocket wheel 262 keyed to the first camshaft 41.

The driving portion of the freewheel 250 over which the chain 251 runs bears a catch 263 cooperating with a locking pawl 264 which is continuously urged into engagement with this catch by a spring 265 but which can be moved away from the path of said catch responsively to an electromagnet 266 controlled by a microswitch 267 located beneath position 139b of the mandrels 139. This arrangement acts as a safety system which, by energizing the electromagnet, detects the presence of sleeves before their arrival at the bottom-fitting station and which, by de-energizing the electromagnet, interdicts swaging and cutting of a bottom whenever a mandrel occupying the second position 139b is devoid of a sleeve.

At each revolution of the shaft 259, the follower 257 is thrust away and, through the agency of levers 256 and 254 and spring 253, exerts a pull on the corresponding end of the chain 251. If the pawl 264 is not in the locking position, i.e. if the electromagnet 266 is energized, the chain will be shifted by a corresponding amount and move with it the driving portion of the freewheel 250 together with the cylinder 239, thus rotating the two cylinders 239 and 235 through an angle corresponding to the length of cardboard strip needed to fabricate a bottom.

The length of strip advanced in this manner then moves down against the front face of a circular die 268 positioned with its axis horizontal (see FIG. 26) and serving to swage and cut out the bottoms. This front face of the die lies substantially in the vertical plane tangential to the two cylinders 235 and 239. The die 268 is secured against a plate 269 rigid with the block 229.

Coaxially with the die 268 is disposed a circular piston 270 the rear end of which is connected through a link 271 to a crank-pin 272 carried by the eccentric 258 rigid with the shaft 259. This piston slides through a cylinder 273 the ends of which are retained between two plates 274 and 275 rigid with the block 229.

The front end of the piston 270 carries a cylindrical swaging punch 276 the outer diameter of which is substantially equal to the inner diameter of the die 268 less twice the thickness of the cardboard of which the bottom is made. This punch 276 is fixed to the end of the piston 270 by a central screw 277. Between the side walls of an annular groove formed in this piston and this punch is gripped a cutting ring 278 the outer diameter of which is substantially equal to the inner diameter of the die 268. The axial length of the punch 276, between its outer face and the cutting ring 278, is equal to the height at least of the flange 10 which is to be turned up around the swaged bottom 3.

As the punch 276 penetrates into the die 268, it first swages a bottom out of the length of cardboard strip which has moved down in front of the die, and then, when the ring 278 reaches the edge of said die, it cuts out the raised flange 10 on the swaged bottom. The punch continues its travel until its end and the swaged bottom have fully emerged from the rear face of the die, i.e. from the left-hand face in FIG. 26. When the piston 270 draws back, the elasticity of the cardboard of which the swaged bottom is made causes the flange to flare slightly to an extent sufficient for its end-section to bear against the rear face of the die; the bottom is thus held stationary as the piston continues to withdraw. When the punch 276 has emerged from the die toward the right, the swaged bottom drops into a supply trough 279 to be described hereinafter.

In order to enable the cardboard strip to be conveniently threaded between the cylinders 235 and 239 when a new roll of cardboard is fitted, the cylinder 235 can be moved away from the cylinder 239 by means of a handle 280 rigid with a shaft 281 which is pivotally mounted on top of the block 229 and which supports two cams 282 and 283 coacting with two fingers 284, 285. These fingers are pivoted horizontally on said block whereby to thrust away the two housings 230, 231 against their return springs 244, 245.

A safety guide consisting of a plate 286 having an opening therein of diameter substantially equal to that of the bottom-cutting ring 278 is closely spaced ahead of the entry face of the die 268, the cardboard strip to be cut being threaded between this guide and the die.

Reference to FIG. 29 shows that the supply trough 279 is generally loop-shaped. It receives through its entrance 287 the bottom 3 formed with its flange 10 and discharged from the die 268. Adjacent this entrance and upstream thereof along the path to be followed by the bottom is provided an air discharge point 288 connected through a pipe 289 to the blower 53. A second air discharge point supplied from the same pipe 289 is located at 290 at the end of the loop in the supply trough. Under the action of the air jet issuing from the point 288, the bottom is caused to travel round the loop in the trough 279 and to be thereby turned over; then, responsively to the air jet issuing from the point 290, the bottom is conveyed toward the bottom-fitting station of the pot-finishing station with its smaller base correctly orientated for the fitting operation. A safety device consisting of a rod 291 which penetrates into the supply trough 279 and which is adapted to operate a microswitch 292 connected into the feed circuit to the electromagnet 266 halts the swaging and cutting-out operation on the bottoms should an incorrectly shaped bottom be introduced into the trough.

The pot-finishing station comprises the revolver-plate 15 provided with six sockets 293 formed by means of parts 294 which are secured by flanged portions 295 to that face of the plate 15 which is remote from the revolver-head 13, and these parts are formed with an internal frusto-conical opening the larger base of which is directed toward said revolver-head. The longitudinal dimension of a part 294 is determined so that its larger base coincides with that level above the larger base of the sleeve 209 along which is to be formed the crease line for the fold 11 in the sleeve, the smaller diameter of the part 294 being greater than the outer diameter of the rolled edge to be formed on the smaller base of the sleeve.

The revolver-plate 15 is rotated stepwise in 60-degree steps by its shaft 296 which extends up to the support 164 (FIG. 20) in which it is supported by a ball bearing. The shaft 296 carries a bevel gear 297 meshing with a bevel gear 298 mounted on the hollow shaft 160 which is rotated stepwise by the cam device 165. The pitch diameter of bevel gear 297 is equal to one and a half times the pitch diameter of bevel gear 298, whereby, each time a mandrel 139 rotates through a quarter-revolution at the sleeve fabricating station, the revolver-plate revolves through one-sixth of a revolution in order to enable a socket 293 to replace the previous one. The revolver-plate 15 is driven in the direction of arrows F in FIGS. 31 and 32, so that each socket successively occupies positions 293a through 293f.

Reference is next had to FIGS. 32 through 34 for a representation of a socket in each of these positions 293a through 293f, together with the corresponding tools, the sleeve being shown after it has been shaped by the tools associated to each of these positions, an exception being the position 293f in which the part is shown completed.

In position 293a the socket receives from the belts 210 of the second transfer device a sleeve issuing from the sleeve-fabricating station. The sleeve 209 is then positioned in the socket as shown at the top of FIG. 32.

The revolver-plate 15 then rotates through one-sixth of a turn and fetches the socket into position 293b shown at the top of FIG. 33. In this position, the socket has its larger base aligned over a bottom-positioning device disposed beneath the exit of supply trough 279. This device comprises a barrel 299 of generally tubular frusto-conical shape with a lateral cutaway section 300 on its top, this section registering with the exit of the trough 279 and enabling a bottom to pass through it transversely and be deposited in the barrel. The latter is secured to a vertical transverse wall 301 coaxially with the socket in position 293b. Coaxially with the barrel is mounted a pusher 302 carried by a rod 303 sliding through a fixed bush 304 responsively to a rocking lever 305 which is fulcrumed about a fixed pin 306 carried by a support 307 fixed to the machine stand. The diameter of the pusher 302 is slightly less than the inner diameter of a bottom. The rod 303 carries two terminal collars 308 and 309 between which is movable a roller 310 carried by the lever 305. A return spring 311 is anchored onto the end of the rod 303. The other end of lever 305 carries a follower 312 which is urged by the spring 311 into pressure contact against a cam 313 fixed to the second camshaft 45.

On the other side of the socket in position 293b is a plate 314 carried by a rod 315 sliding through a bush 316 mounted on a second vertical transverse wall 317. This plate, the diameter of which is less than the inner diameter of the smaller base of the sleeve, is acted upon by a lever 318 fulcrumed about a fixed pin 319 carried on a support 320 fixed to the machine stand. This lever carries on one of its ends a roller 321 which is movable between two collars 322 and 323 rigid with the rod 315, and at its other end a follower 324 which is spring-loaded by a spring 326 against a cam 325 mounted on the first camshaft 41. The contours of the cams 313 and 325 are so devised that when a bottom which has penetrated into the barrel 299 is positioned by the pusher 302 within the sleeve 209, the plate 314 press the bottom against the pusher to prevent its distortion. The bottom 3 is so positioned that its flange 10 come into contact with the inner surface of the sleeve 209, with its free edge level with the larger base of the socket-forming part 294 whereby to leave free the sleeve terminal portion 11a adjacent the larger sleeve base.

As the revolver-plate 15 rotates through a sixty-degree step the socket is fetched from position 293b to position 293c (FIG. 33). In this position, facing the larger base of the socket, is disposed a tool 327 for creasing and folding the sleeve portion 11a. This tool consists of a washer 328 having a hollow frusto-conical surface 329 which is broadly flared outwardly and provided with radial flutings 330, while the washer 328 has formed thereon an annular throat 331 accommodating an electrical heating resistor 332. The larger base of the frusto-conical surface 329 has a diameter substantially equal to the inner diameter of the larger base of the part 294. The washer 328 is fixed to a base-plate 333 rigid with a tube 334 sliding through a bush 335 mounted on the wall 301. In order to prevent too much of the heat stored in the washer 328 from being transmitted to the wall 301, holes 336 and 337 are formed in the plate 333 and the tube 334.

The sliding motion of the tube 334 is imparted by a roller 338 carried by the lever 305. A spring 339 interposed between the bush 335 and a collar 340 rigid with the tube 334 urges the tube 334 against a roller 338. Responsively to the tube 337, the sleeve portion 11a is shaped as at 11b, as is clearly shown in the lower part of FIG. 33.

On the other side of thet socket in position 293c is disposed a tool 341 for lubricating the sleeve internally over the area adjacent its smaller base in order to facilitate the forming thereof into a rolled edge. This tool consists of a body portion 342 provided with a hollow stem 343 sliding through a bush 344 fixed to the wall 317. Onto the body 342 is mounted a hollow expandable felt washer 345 cut into six parts to form contiguous triangular sectors having an angular aperture of sixty degrees. In its contracted form this felt washer 345 has an outwardly-flared frusto-conical projection, the larger base of which has a diameter less than the inner diameter of the smaller base of the sleeve and the conical surface of which is parallel with the inner surface of the sleeve. The support for each felt washer portion carries a stud 346 which penetrates into a radial bore in the body 342, in which bore it is spring-loaded by a spring 347 retained by a screwed plug 348. Within the hollow stem 343 is positioned a rod 349 terminating in a six-sided pyramid-shaped head 350, and each of these sides is adapted to bear against a matching inclined face formed on the corresponding support of one of the felt washer portions. The rod 349 supports a collar 351 against which bears a spring 352 fitted between this collar and an inner thrust surface of the stem 343. The latter is also connected to a return spring 353 and its end is in contact with a roller 354 carried by the lever 318.

When, responsively to the cam 325, the lever 318 tends to shift the stem 343 and the body 342, this movement occurs over a distance sufficient to cause the felt washer 345 to penetrate in the compressed condition into the rim portion of the smaller base of the sleeve 209. This motion is arrested when a collar 355 carried by the stem 343 abuts against the bush 344. As it continues its own movement, the lever 318 then compresses the spring 352 and advances the pyramid-shaped head 350, thereby causing a radial expansion of the six portions of the felt washer 345 which, having been previously impregnated with a lubricating substance in any convenient manner, are pressed against the internal rim portion of the sleeve, onto which they deposit this lubricating substance.

Having been shaped thus in the manner shown in position 393c of FIG. 33, the revolver-plate 15 undergoes a fresh sixty-degree stepwise rotation and fetches the socket into position 293d (see FIG. 32). In this position, facing the larger base of the socket, is a crimping device 356 centered upon said socket. This crimping device includes a body portion 357 onto which is fixed a part 358 spaced therefrom to form an annular gap 359 in which are lodged heating means utilizing electric power or hot oil, for instance. The compound 357, 358 is rigid with a hollow stem 360 sliding through a bush 361 fixed to the wall 301. The body 357 forms a support for six triangular-sector-shaped fluted jaws 362 subtending an angle of sixty degrees. In their retracted condition these jaws have a frusto-conical projection the smaller base of which faces the socket and the frusto-conical lateral surface of which is parallel with the inner surface of the sleeve and spaced therefrom at a distance greater than twice the thickness of the sleeve augmented by the thickness of the flange on the container bottom. The jaws are secured by means of studs 363 which penetrate into radial openings in the body 357 and which are spring-loaded by springs 364 retained by plugs 365. In the hollow stem 360 is disposed a sliding rod 366 terminating in a six-sided pyramid-shaped head 367, and each of these sides is in contact with a matching face formed inside the corresponding jaw 362. The rod 366 carries a collar 368 against which bears a spring 369 the other end of which bears against an internal abutment of the stem 360. A return spring 370 is connected across the stem 360 and the machine stand. Against the end of the rod 366 bears a roller 371 carried by a lever similar to the lever 305 and the other end of which bears, through a follower, against a cam 372 mounted on the second camshaft 45. This system operates in similar manner to the oiling system 341.

On the other side of the socket in position 293d is disposed a plate 373 rigid with a rod 374 sliding through a sleeve 375 mounted on the wall 317, and the diameter of this plate is greater than the outer diameter of the smaller base of the sleeve. The rod 374 is acted upon by a return spring 376 bearing against the sleeve 375 and against a collar 377 rigid with the rod 374. The end of this rod is in contact with a roller 378 carried by a lever of the same type as the lever 318 and which additionally carries a follower sliding over a cam 379 mounted on the first camshaft 41. The degree of travel of rod 374 is determined in such manner that the plate 373 comes to bear against the smaller base of the sleeve 209 when the oiling device 356 is operative.

In their retracted position and responsively to the roller 371, the jaws 362 are brought into contact with the wall of the bottom 3 facing them. In this position a collar 380 rigid with the hollow stem 360 abuts against the bush 361, after which, still in response to the roller 371, the spring 369 is compressed and the pyramid-shaped head 367, as it moves toward the bottom 3, expands the jaws 362 which then thrust the portion 11b against the bottom-flange 10 whereby a sleeve fold 11 is formed which grips the flange between itself and the inner wall of the sleeve. The flutings on the jaws 362 register with the flutings formed on the portion 11b by the tool 327, thereby tightly pressing the portion 11b, onto the flange 10 at the same time as the heat generated by the means accommodated in the gap 359 melts the polythene film covering the portion 11b whereby to bond it to the flange 10. In order to avoid excessive heat conduction to the wall 301, the hollow stem 360 has a series of openings 381 formed therein.

The revolve-plate 15 then rotates through a sixty-degree step and fetches the socket into position 293e (FIG. 34). In this position is disposed, facing the larger base of the socket and coaxially therewith, a second crimping tool 356a devised in similar manner to the tool 356 used in position 293d. This tool will not be described anew, and its component parts bear the same reference numerals as those in FIG. 32, followed by the letter a.

On the other side of the socket in position 293e, i.e. on the side of its smaller base, is disposed a tool 382 for forming the rolled edge on the pot. Preferably, this tool is devised as shown in FIG. 34 and is of the kind described in U.S. patent application Ser. No. 428,327 filed January 27, 1965, by the applicant and entitled "Apparatus for Forming a Rolled Edge on Containers Made of Sheet Material".

This apparatus comprises a hollow tool-carrier 383 which is centered upon the socket and secured by a base-plate 384 to the wall 317, and this tool-carrier supports a bell-mouth 385 terminating in an inner chamfer 386. Inside the tool-carrier is mounted a hollow sliding part 387 forming the tool shank and terminating in a jaw-bearing web 388. Extending through said part is a rod 389 terminating in a six-sided pyramid-shaped head 390. Against the sides come to bear slides 391 (see FIGS. 34 and 35) shaped as triangular sectors subtending an angle of sixty degrees and terminating externally in chamfers 392 which in the inoperative position engage with the chamfer 386 on the bell-mouth 385. Each side is retained on the jaw-carrier 388 by a screw 393, a spring being interposed between the head of the screw and a thrust washer 394 applied against the rear face of jaw-carrier 388. Each screw extends through a slot 395 formed in the jaw-carrier and thus acts as guiding means for the corresponding slide 391.

Onto each slide 391 is fixed, by means of a screw 396, a part 397 for retaining the corresponding jaw, and this part is centered within said slide by an arcuate tenon engaging in a matching mortise 398 in said slide. Between each slide 391 and each retaining part 397 is mounted a jaw 399 made of antifriction material which is set into a lodging in the slide and has formed thereon an arcuate rib 400 engaging in a matching groove on the part 397.

At the center each jaw terminates in a flat portion 401 in contact with the larger base of a frusto-conical part 402 in antifriction material, that is centered upon the axis of the apparatus and provided with a cylindrical base for centering the jaws. The part 402 is spring-loaded against the jaws 399 and the slides 391 by a screw 403 carried by the rod 389 and beneath the head of which is positioned a spring which thrusts a washer 404 against the smaller base of said frusto-conical part 402. This frusto-conical part is provided adjacent its larger base with a circular throat 405 of quarter-circle cross-section, formed along a diameter equal to the inner diameter of the smaller base of the sleeve. This throat is extended, over the forwardly flared frusto-conical surface of the retracted jaws which surround said frusto-conical part, by a circular arcuate groove 406 of semicircular cross-section the forward edge of which is spaced from the outer frusto-conical surface of the part 402. The throat 405 and the grooves 406 jointly form a rolling die.

The tool shank 387 has formed in its other end a recess accommodating a spring 407 which bears against a collar 408 rigid with the rod 389. The tool shank carries an additional collar 409. The spring 407 urges the rod 389 away from the tool shank 387 until a pin 410 rigid with the tool-carrier butts against the forward end of a slot 411 formed through the rod 389. A spring for returning the tool-carrier 412 is connected across the collar 409 and the machine stand.

The edge-rolling apparatus is acted upon by a roller 413 carried by a lever 414 fulcrumed at 415 and carrying at its other end a follower 416 riding over a control cam 417 mounted on the first camshaft 41.

In response to this cam, when the lever 414 rocks toward the right of FIG. 34, the follower thrusts away the rod 389 and the tool-carrier 387 against the spring 412, thereby disengaging the chamfer 392 formed on the slides from the chamfer 386 formed on the bell-mouth. The terminal portion of the sleeve 209 then penetrates into the rolling die and is shaped into a rolled edge, and in so doing progressively thrusts the slides 399 radially outwards as the diameter of its rolled edge increases, thereby enabling the rolled edge to be formed without any constraint being exerted on it by the jaws 399. The rolling operation ends when the collar 409 abuts against the tool-carrier 383.

From this point onwards, and in response to the roller 413, the rod 389 moves toward the right and its pyramid-shaped head 390 expands the slides 391 and the jaws 399 which they carry in order to enable the rolled edge 2 to be disengaged from the rolling die. The compound is then moved back under the action of spring 412, and as the chamfer 392 contacts the chamfer 386 of the bell-mouth 385 the slides/jaws compound is returned to the position shown in FIG. 34. At this stage the pot is completely fabricated and requires no more than a complementary operation for making it leakproof around its bottom.

The revolver-plate 15 accordingly rotates through a fresh sixty-degree step and fetches the socket into position 293f (see FIG 34). In this position, there is centered upon the socket an ejection plate 418 of diameter substantially equal to the outer diameter of the rolled edge and which is rigidly connected to a rod 419 sliding through a bush 420 mounted on the wall 417. This rod has sliding motion imparted to it by a roller 421 mounted on the end of lever 414 and which moves between two collars 422 and 423 rigid with said rod, which rod is additionally acted upon by a return spring 424. Facing the rolled edge 2, the ejection plate 418 carries a central boss 425 adapted to penetrate into the pot for maintaining the same directionally when it is ejected.

Responsively to the cam 417, the roller 421 slides the rod 419 to the right, and the ejection plate 418 contacts the rolled edge 2 and thrusts the pot toward the right and beyond the socket part 294.

The plate 15 then rotates through a fresh sixty-degree step and brings the socket into position 293a of FIG. 32, and the cycle recommences.

The completed pot ejected by the plate 418 drops into a distributor which, as clearly shown in FIG. 36, consists of a horizontal basket-like device formed with a vertical end-closure 426 oscillatably mounted on a fixed pin 427 and supporting a set of circularly aligned fingers 428a through 428d, the distance between consecutive fingers being smaller than the width of a pot, and the distance between the terminal fingers 428a and 428d providing a passageway of width slightly greater than that of a pot. The set of circularly aligned fingers on the distributor is coaxial, in the inoperative position, with the socket axis in position 293f. These fingers are canted inwardly as they extend from the vertical end-closure 426 whereby to substantially follow the inclination of the pot wall, and terminate in hooked ends 429 adapted to receive the rolled pot edge. On a part 430 fixed to the machine stand is mounted a vertical rod 431 the upper end of which is bent at right angles toward the plate 15 and is formed into a curved tip 432. The purpose of this curved tip 432 is to prevent an ejected pot from reaching the basket in an oblique position. On the pin 427 is mounted a lever 433 supporting at its extremity a roller 434 which is located in the circular path followed by that portion of the socket body 294 which projects on the ejection side.

When the plate 15 fetches the sockets from position 293a to position 293f, their projecting portion 294 contacts the roller 434 and rotates the basket assembly and fetches its large opening uppermost while at the same time stretching a spring 435 connected across the end-closure 426 and the machine stand. The basket is then ready to receive the pot which is ejected in socket position 293f, without the pot being able to drop out of the basket. Then, when the plate shifts the socket from position 293f to position 293a, the roller 434 escapes from the projecting portion of the socket body 294 and the basket pivots about the pin 427 in response to the spring 435 and allows the pot to slip through its large opening between fingers 428a and 428d. The pot then drops onto slideways 436 mounted on the machine stand.

These slideways convey the pot to the terminal heating device 26. The latter comprises two side plates 437 and 438 which are held in fixed mutually spaced relation through being secured to a lower U-iron 439. Through the agency of supports 440, the side plate 438 carries a guide rail 441 on which the pots rest. The U-iron 439 likewse supports a guide rail 442. The rail 441 and 442 are positioned between the side plates 437 and 438 in coincidence with the vertical plane passing through the center of gravity of the finished pots. An electric motor 443 supported on the plate 437 drives a sprocket wheel 434 over which runs an endless chain 435 which is guided through the device by intermediate sprockets and the links of which carry entrainment pegs 444 at intervals slightly greater than the width of a pot. The side plate 438 additionally supports an infra-red type heating tube 445 level with the shaft of motor 443. The distance between the tops of guide rails 441 and 442 is such that when the pots rest on these rails and are guided laterally by the side plates 437 and 438, the area adjacent the bottoms of the pots are spaced from the heating tube 445.

The pots conveyed to the heating assembly 26 by the ramps 436 penetrate in turn between consecutive pairs of pegs 444 and are entrained thereby as they roll along the upper rail 441. They next descend onto the lower rail 442 along which they continue to be rolled by the pegs 444. During this time, the heat radiated by the tube 445 bonds the outer face of the container-bottom flange 10 against the inner wall of the pot. Thus, a pot is obtained the bottom of which has its flange bonded on both of its faces. The terminal heating operation lasts approximately twenty seconds.

At the bottom of the terminal heating device 26 is positioned a pipe 446 having an inner diameter slightly greater than the pot diameter. This pipe is connected through a by-pass 447 (see FIG. 38) to the blower 53. Into the by-pass 447 is connected a nozzle 448 which produces, upstream thereof, a negative pressure in the pipe 446 designed to suck in the pots and then to repel them by means of the air jet blowing through the pipe downstream of the nozzle 448, thereby enabling the fabricated post to be discharged. If, for any reason, a sleeve has undergone all the pot-finishing operations without being fitted with a bottom, the effect of the nozzle 448 is nullified and, on issuing from the terminal heating device 26, the bottomless sleeve drops under gravity without being conveyed into the discharge pipe 446.

The waste cardboard resulting from the work of the cutter 22 and collected in the receptacle 113 is expelled therefrom by an air jet which is produced by the blower 53 and ducted to the receptacle through a pipe 449 having a terminal ejector 450. The waste is conveyed through a pipe 451 to the exit end of an ejector 452 surrounded by an enclosure 453 which is connected through a pipe 454 to the blower 53. The wall of the enclosure 453, into which have port the pipe 451 and the ejector 452, is positioned beneath the bottom-swaging and cutting station, in spaced relation from the front face of the die 268. The waste material 455 obtained in perforated strip form or as intermittent waste material during the swaging and cutting of the bottoms descends before the outlet of ejector 452. The air jet issuing from ejector 452 and from pipe 451 causes the waste from the cutting and the swaging and cutting-out operations to be expelled into a bellmouth 456 connected to a discharge pipe 457.

The various tools are lubricated with molybdenum disulphide by an automatic system the component parts of which are not shown for greater clarity in the drawings. The tool temperatures are controlled by electronic regulators. The heating tubes 24 and 445 and the heating blade 123 are likewise regulated by electronic devices. The tool portions subjected to heat are preferably made of oxysulphated steel. The operating cycle of the subject machine of this invention is rapid enough to prevent the polythene film which is melted beneath the heating device 24 from resolidifying before the jaws 146, 147 have performed their function and the pressers of stations 139a through 139c have leaktightly joined the edges of the blank along the sleeve generatrix.

It will, of course, be understood that many changes and substitutions of parts may be made to the form of embodiment hereinbefore described, without departing from the scope of the invention.

Furthermore, a machine of the same kind could be used for fabricating, not yoghurt pots, but frusto-conical tumblers which differ from the yoghurt pots in that their bottom is fitted across their smaller base and the rolled edge formed over their larger base. For such an application, the positions of the barrel 299 and the plate 314 would require to be reversed at station 293b (see FIG. 33). At station 293c, the folding/fluting tool 327 would have to be positioned on the other side of the sleeve and replaced by a bottom-restraining plate similar to the plate 314, while the inside oiling tool 341 could be dispensed with since the rolled edge is to be formed over the larger base of the sleeve. At station 293d it would suffice to switch the positions of the crimping device 356 and the plate 373. Also, at station 293e, it would likewise be necessary to switch the positions of the crimping tool 356a and the rolled-edge forming tool 382. Lastly, in the terminal heating apparatus, the tube 445 would require to be rigid with the side plate 437 since it would have to bond the bottom-flange externally to the inner face of the tumbler in the region of its smaller base.

What I claim is:

1. In a machine for fabricating frusto-conical containers with a sealed lateral lap-joint from sheet material such as cardboard covered on one side with a film of plastic resin, of the kind comprising, in succession, a magazine for storing sheet material blanks shaped as annular sectors and disposed with their coated face uppermost and their circular edge of smaller radius directed rearwardly, a device for linearly transferring these blanks one by one from the bottom of said magazine to beneath one of the mandrels of a vertical-axis revolver-head which is equipped with four horizontal-axis frusto-conical mandrels secured radially thereto by their larger bases and which is driven in successive ninety-degree steps about its axis, a set of jaws and pressers for wrapping and laterally sealing each blank on the corresponding mandrel with its coated face in contact therewith whereby to form a frusto-conical sleeve, a second device for linearly transferring each frusto-conical sleeve to a container-finishing station whereby to mount said sleeve with its larger base directed toward said second transfer device in a socket of a horizontal-axis revolver-plate having six frusto-conical sockets thereon and rotated in successive sixty-degree steps about its axis, said sleeve during the stepwise movement of said revolver-plate being operated upon by a device for positioning thereon a bottom which a third transfer device conveys from means for cutting and swaging container bottoms, out of a strip of said coated sheet material, to form a bowl-shape with a flared frusto-conical flange having its coated surface outwards, by a device for folding the corresponding end of said sleeve over said bottom-flange, by a device for hot-crimping the fold obtained thereby, by a device for forming a rolled edge on the other end of said sleeve and by a device for ejecting the container constituted by said sleeve provided with said bottom and said rolled edge, control means for driving in sequential relationship the revolver-head with its jaws and its pressers, the revolver-plate, the means for cutting and swaging the bottoms, and the entirety of said devices, and means responsive to the absence of a sleeve on a frusto-conical mandrel for rendering the bottom-cutting and swaging means temporarily inoperative; the improvement which comprises, above said first transfer device, means for cutting a bevel through the thickness of the sheet material alone along that straight edge of the blank which is to form the inner overlapping portion of the lap-joint down the side of said sleeve, means for folding this bevel-cut outwardly relative to the coating on the blank, means for heating the other straight edge of the blank whereby to melt its coating without scorching the sheet material; means at the exit end of said first transfer device for wrapping said blank about the revolver-head mandrel which is halted following one of its stepwise rotations facing the axis of said first transfer device, by applying the straight blank-edge with its melted coating against the outwardly folded coated border of the other straight blank-edge, pressers made of elastic material for pressing together these straight overlapping edges on said mandrel during this and the next two stepwise rotations of said revolver-head; facing the successive positions of the revolver-plate socket carrying a frusto-conical sleeve, on the side of the larger sleeve base, on the one hand, a device for positioning the bottom inside the sleeve while leaving a sleeve portion free between the larger sleeve base and the rim of the bottom-flange, a device for hot-folding said sleeve portion inwardly, and two consecutive hot-crimping devices for sealing this fold against the inner flange wall and, on the side of the smaller sleeve base, on the other hand, thrust means for the bottom when the same is being positioned, means for lubricating that portion of the inner sleeve wall which is adjacent the smaller sleeve base and over which said rolled edge is to be formed, means for restraining the sleeve by its smaller base during the first hot-crimping operation on said fold, means for forming said rolled edge and a device for ejecting the container from this mandrel; distributor means receiving the ejected container from said revolver-plate, terminal heating means receiving each container from said distributor means whereby to heat its external portion adjacent its larger base and seal together the mutually contacting surfaces of said bottom-flange and of said sleeve without scorching the sheet material, means for ejecting the finished container from said terminal heating means, means for reversing said bottoms on said third transfer device, and means for discharging the waste material obtained from said bevel cuts and from cutting and swaging said bottom, whereby the fabricated frusto-conical container is open over its smaller base and the substance it is to contain is enclosed in an unbroken chamber of thermo-plastic resin without any possibility of contact with said sheet material, thereby resulting in an absolutely leakproof container.

2. A machine according to claim 1, wherein said blank magazine comprises two vertical plates for maintaining the blanks lengthwise and widthwise one of which is disposed parallel with the first direction of transfer, supports for supporting said plates, two shafts carried by said supports in parallelism with said plates and positioned at the base of said plates just inside the gap separating the same, small balls mounted on each shaft, and two inwardly projecting points positioned on said supports level with said balls and substantially at the center of the circular edges of the blanks.

3. A machine according to claim 2, wherein said first transfer device comprises, in succession, means for withdrawing a blank in translation from the base of said magazine, means for conveying the withdrawn blank and fetching its straight edge parallel with the first direction of transfer beneath the means for making the bevel-cut and then beneath the means for folding said bevel-cut, means for slewing the blank until its other straight edge is parallel with said first direction of transfer and for conveying it in this position beneath said heating means, and second means for slewing the blank until its axis of symmetry is parallel with said first direction of transfer and for conveying it in this position beneath a frusto-conical mandrel of said revolver-head.

4. A machine according to claim 3, wherein said blank withdrawing means and said blank conveying and slewing means comprise an arm movable vertically beneath said magazine, suction cups carried by said arm, vacuum-generating means connected to said suction cups, a valve connected between said suction cups and said vacuum-generating means, means for operating said valve rigid with said arm, a part adapted to be moved in horizontal reciprocaitng motion and having level with said suction cups in the bottommost position of said arm an upper wall which receives the blanks and has formed therein a plurality of pairs of openings located respectively on either side of the axis of the transfer device, ratchets projecting above said openings and pivotally connected to said part rearwardly of the corresponding openings, springs for biasing said ratchets upwardly, pivotal arms inclined in the direction of transfer and bearing on said upper wall, fixed pins bearing said pivotal arms and so disposed that said arms bear against the circular blank-edge of larger radius when said ratchets retract toward said magazine, and a transmission interposed between said control means and said arm and said part for moving said arm and said part upwardly and in horizontal sliding motion respectively, said ratchets bearing in pairs on the circular blank-edge of smaller radius and being disposed in three successive sets, in the first of which the ratchets in each pair are disposed along a line inclined forwardly toward the straight edge parallel with the direction of transfer of the blank extracted from said magazine, in the second set of which the ratchets in each pair thereof are disposed along a line inclined forwardly toward the other straight edge of the blank which is slewed into parallelism with said direction of transfer, and in the third set of which the ratchets in each pair thereof are disposed perpendicularly to the direction of transfer.

5. A machine according to claim 1, wherein the means for cutting the bevel in the straight edge of the blank and for holding this bevel cut comprise a long cutter co-extensive with said straight edge, means for maintaining said straight edge aligned with the axis of said cutter with the coated face of the blank remote from said cutter, means for applying a force on said maintaining means in the direction of said cutter, means for folding the bevelled edge of the sheet away from its coated side and a heated blade penetrating into the fold thereby obtained.

6. A machine according to claim 5, wherein said folding means comprise an angle-piece with a horizontal flange having formed thereon opposite the extremity of the bevelled edge of the blank a chamfer receding from said extremity toward the blank coating, means connected to the vertical flange of said angle-piece for moving the same in parallelism with said blank, and linkage means interconnecting said control means and the latter-mentioned means.

7. A machine according to claim 1, wherein the means for heating the other straight edge of the blank comprise an infra-red heating device co-extensive with the first direction of transfer and an optical pyrometer for on-off type regulation of the heating temperature, the length of said heating device being such that the stragiht edge of the blank be subjected to this device for a time sufficient to melt its thermoplastic coating without scorching the sheet material.

8. A machine according to claim 7, wherein said infra-red heating device comprises an aluminum tube embodying openings directed toward the other straight edge of the blank, and an infra-red radiation type quartz tube enclosed in said aluminum tube.

9. A machine according to claim 8, wherein said aluminum tube comprises means for pivoting the same about its axis whereby to orientate the openings therein differently in the event of an accidental machine stoppage, and thereby prevent igniting of the blank.

10. A machine according to claim 9, wherein said means for pivoting the aluminum tube comprise a finger fixed to said tube, a return spring interconnecting said finger and the wall of the machine, an electromagnet having a plunger core comprising a first straight portion bearing against said finger in opposition to said spring in the operative position of said tube, a ramp spaced from said finger and, in extension thereof, a straight terminal portion parallel with said first portion, said electromagnet being energized by an accidental machine stoppage whereby to attract its plunger core in such manner that said finger be thereby pulled back by said spring and brought into contact with said terminal straight portion of the core.

11. A machine according to claim 1, wherein the means for wrapping said blank about said revolver-head mandrel comprises a vertically movable body positioned beneath said mandrel and formed with an upper surface matching the lateral surface of said mandrel, a fixed tubular support through which said body is movable, a mobile mounting plate interposed between said body and said support and projecting on either side of said body at right angles to the mandrel axis, a spring housed in said support and bearing against said mounting plate, two jaws pivotally connected to said body on either side respectively of the diametrical vertical plane through said mandrel and shaped to match the shape of said mandrel, screws carried by said mounting plate and bearing beneath said jaws whereby to regulate the position thereof relative to said body, and sequential means for first closing the jaw which wraps the blank portion having had its straight edge bevelled and folded and for then closing the jaw which wraps the blank edge having had its straight edge heated, said vertical movable body applying the central area of the blank against the lowermost region of said mandrel responsively to said spring housed in said support, before said jaws close.

12. A machine according to claim 11, wherein the sequential means for closing two jaws in succession comprise two rods respectively pivotally connected to said jaws, a second fixed support, two levers pivotally connected to different points on said fixed support and connected to said rods, two followers respectively carried by said levers, two cams respectively coacting with said followers for opening said jaws, two return springs fixed to said levers whereby to close said jaws, and a transmission connecting said cams to said control means, the contour of said cams and the lengths of said rods and of said levers being so determined that the jaw adapted to wrap the blank portion having had its straight edge heated close only after closure of the jaw adapted to fold the blank portion having had its straight edge bevelled and folded.

13. A machine according to claim 1, wherein the upper mandrel surface over which the straight blank edges are caused to overlap is of cylindrical shape and extends parallel with the mandrel generatrix.

14. A machine according to claim 1, wherein said second transfer device comprises a support rigid with the machine stand, two substantially horizontally aligned shafts parallel with the first transfer direction and carried by said support, two compound pulleys respectively mounted on said shafts with their centerplane perpendicular to said first direction of transfer and passing through the axis of the halted ejection mandrel, the compound pulley adjacent the revolver-head having a diameter greater than that of the other compound pulley adjacent the revolver-plate, two endless V-belts running over said compound pulleys, and a transmission connecting one of said shafts to said control means.

15. A machine according to claim 1, wherein said revolver-plate comprise six frusto-conical sockets which position themselves in superimposed pairs lying in three vertical parallel planes at each stepwise rotation of said revolver-plate, the uppermost socket contained in the central vertical plane receiving a sleeve which is conveyed by said second transfer device with its larger base turned toward the same, the smaller diameter of each socket being greater than the outer diameter of the rolled edge to be formed on said smaller sleeve base and its longitudinal dimension being such that its larger base coincides with that level of the sleeve above the larger base thereof along which is to be formed the crease for the fold on said sleeve.

16. A machine according to claim 15, comprising, on that side of the revolver-plate which faces said revolver-head and on its other side respectively, in one of the vertical lateral planes, coaxially with the uppermost socket, said bottom-positioning device and said bottom-bearing device and, coaxially with the lowermost socket, said hot-folding device and said lubricating means for the inner sleeve wall, in the central vertical plane, coaxially with the lowermost socket, the first hot-crimping device and the means for restraining the sleeve by its smaller base and, in the other lateral vertical plane, coaxially with the lowermost socket, said second hot-crimping device and said rolled edge-forming device, the ejection means being mounted coaxially with the uppermost socket lying in said other lateral vertical plane on that side of said revolver-plate which is remote from said revolver-head.

17. A machine according to claim 16, wherein each device disposed on either side of said revolver-plate, coaxially with said sockets in their halted position following a stepwise rotation of said revolver-plate, is controlled through a transmission system comprising a cam connected in driven relation to said control means, an actuating lever pivoted about a fixed point, a follower mounted on said actuating lever and riding over said cam, a roller mounted on said actuating lever and in contact with said device, and a spring urging said device against said roller, said actuating lever being unique for controlling two devices positioned on the same side of the plate, coaxially with two sockets contained in the same vertical plane, and carrying a second roller in contact with the device which is not in contact with the first-mentioned roller.

18. A machine according to claim 17, wherein the device for positioning the container bottoms comprises a fixed frusto-conical hollow barrel coaxial with the uppermost socket contained in the first lateral vertical plane, having its smaller base turned toward this socket and provided with a lateral recess over its upper part that is disposed facing the third transfer device and has dimensions such that a bottom be able to pass transversely therethrough with its frusto-conical flange turned away from the socket, a pusher coaxial with and accommodated in said barrel and having a diameter slightly less than the inner diameter of said bottom and a pusher-bearing rod sliding through said barrel and projecting therefrom away from said revolver-plate and in contact with one of the rollers of the corresponding actuating lever, and wherein the bottom-thrust means associated to said container bottom positioning device comprises a plate coaxial with said socket and of diameter less than the inner diameter of the smaller sleeve base, a second sliding rod bearing this plate and in contact with one of the rollers of the corresponding actuating lever, and a fixed bush which is positioned on the side of said plate remote from said socket and through which slides said second sliding rod, the strokes of said pusher and said plate being so determined that said pusher thrusts said bottom into said sleeve up to a position wherein the bottom-flange bears against the inner wall of the sleeve with its free edge level with the larger base of the socket, said plate then bearing against said bottom on the opposite side to said pusher.

19. A machine according to claim 17, wherein the hot-folding device comprises a washer coaxial with the lowermost socket in the first lateral vertical plane and having an annular throat opening out remotely from said socket and, facing the latter, a very broadly and outwardly flared hollow frusto-conical surface formed with radial flutings thereon and the larger base of which has a diameter equal to that of the larger base of said socket, an electrical heating resistor placed in said annular throat, a sliding tubular rod, a first bush through which said rod slides, an end-closure onto which said washer and said rod are fixed, said rod and said end-closure embodying holes therein, said rod being in contact with one of the rollers of the corresponding actuating lever, and wherein the inner sleeve wall lubricating means associated to said hot-folding device comprises a body portion coaxial with said socket and having a hollow stem, a second fixed bush positioned on the side of said body portion remote from said socket and through which slides said hollow stem which projects therefrom, an expandable hollow felt washer sectioned into a plurality of contiguous triangular sectors of equal angular aperture, said washer when contracted having a frusto-conical projection flaring outwardly toward said socket and the larger base of which has a diameter less than the inner diameter of the smaller sleeve base and the frusto-conical surface of which is parallel with the inner surface of said sleeve, an externally projecting radial stud screwed into each washer section, radial springs housed in said body portion and bearing against said studs, a first collar fixedly mounted on said hollow stem at a distance from said second bush equal to the stroke of said hollow stem, a second rod slidably mounted through said hollow stem and having a pyramid-shaped head with a number of facets equal to the number of washer sections and in contact therewith, said second rod being in contact with one of the rollers of the corresponding actuating lever, a second collar rigid with said second rod over the portion thereof projecting from said hollow stem and a spring interposed between said second collar and said hollow stem, the strokes of said washer, of said hollow stem and of said second rod being so determined that said washer and said body portion respectively contact the larger socket base and the smaller sleeve base at the same time as said first collar contacts said second bush, the actuating lever of the inner sleeve wall lubricating means then shifting said second rod whereby to distend said expandable felt washer until it contacts the inner sleeve wall over the area thereof adjacent the smaller sleeve base.

20. A machine according to claim 17, wherein said first hot-crimping device comprises a body coaxial with the lowermost socket contained in the central vertical plane, a heating member fixed to said body remotely from said socket and bounding an annular space with said body, heating means accommodated in said annular space, a hollow stem rigid with said body and said heating member and embodying holes adjacent said heating member, a first fixed bush positioned on the side of said body remote from said socket and through which is slidable said hollow stem, a set of contiguous triangular-sector-shaped fluted jaws of equal angular aperture having when contracted a frusto-conical projection the smaller base of which is turned toward said socket and the lateral frusto-conical surface of which is parallel with the inner surface of the sleeve and spaced therefrom at a distance greater than twice the thickness of the sleeve augmented by the thickness of the bottom-flange, an externally projecting radial stud screwed into each jaw, radial springs housed in said body and bearing against said studs, a rod slidably mounted in said hollow stem and having a pyramid-shaped head with a number of facets equal to the number of jaws and respectively contacting the same, said rod contacting one of the rollers of the corresponding actuating lever, a first collar rigid with that portion of said rod which projects from said hollow stem, a spring interposed between said first collar and said hollow stem, and a second collar mounted on said hollow stem at a distance from said bush equal to the stroke of said hollow stem, and wherein said means for restraining the sleeve by its smaller base associated to said first hot-crimping device comprises a plate coaxial with said socket and of diameter greater than the outer diameter of the smaller sleeve base, a second sliding rod supporting said plate and contacting one of the rollers of the corresponding actuating lever, and a second fixed bush disposed on that side of said plate which is remote from said socket and through which is slidable said second rod, the strokes of said hollow stem and said plate being so determined that the jaws in their retracted position bear against the terminal face of the bottom at the same time as said second collar butts against said first bush and that said plate simultaneously bear against the smaller sleeve base, the actuating lever of the first hot-crimping device then shifting said first rod whereby to expand said fluted jaws and crimp against the bottom-flange that sleeve portion adjacent the larger sleeve base which has been previously folded by said hot-folding device.

21. A machine according to claim 17, wherein the rolled-edge-forming device associated to the second hot-crimping device comprises a hollow tool shank coaxial with the lowermost socket contained in the other lateral vertical plane and terminating in a web facing said socket, a fixed tool support through which said tool shank is slidable and projects on either side therefrom and has a bell-mouth for accommodating said web in the inoperative position, abutment means positioned on said tool shank remotely from said web for cooperating with said fixed tool support, a hollow central frusto-conical part disposed forwardly of said web in the direction of said socket with its smaller base facing the same, said frusto-conical part having formed over its conical surface adjacent its larger base a circular throat of quarter-circle cross-section and having a diameter equal to the inner diameter of the smaller sleeve base, a plurality of jaws mounted on said web between the latter and said central frusto-conical part, accommodated in said bell-mouth in the inoperative position, movable radially in contact with said central part and said web, and projecting radially and forwardly of the rim of said central part with a forwardly-flared conical surface which surrounds the conical surface of said central part and which has formed thereon a circle-arcuate groove of semi-circular cross-section adjacent its larger base, said groove and said throat jointly forming an annular rolling die of three-quarter-circle cross-section with its open side facing sleeve when said jaws are in their retracted position, means for applying said jaws to said web under slight pressure, means for applying said central part against said jaws under slight pressure, a rod slidable through said tool shank, terminating forwardly in inclined planes in contact with said jaws and projecting from said tool shank rearwardly whereby to contact one of the rollers of the corresponding actuating lever, a collar fixed to said rod, a spring interposed between said collar and said hollow tool shank, means for connecting said rod to said tool shank while permitting it to slide therethrough, the strokes of said hollow tool shank and said sliding rod being so determined that said sleeeve be rolled outwardly over its smaller base in said rolling die until said abutment contacts said fixed tool support whereupon said actuating lever shifts said rod whereby to spread said jaws and free the rolled edge obtained, and means for retracting said jaws when said hollow tool shank recedes from the sleeve with its rolled edge.

22. A machine according to claim 17, wherein said container ejecting device comprises an ejection plate coaxial with the uppermost socket contained in the other lateral vertical plane, of diameter substantially equal to the outer diameter of the rolled edge and having a central projection directed toward said rolled edge and adapted to penetrate into the container fabricated during the preceding operation, a rod fixed to the side of said plate remote from said socket, and a fixed bush through which said rod is slidable, said rod contacting one of the rollers of the corresponding actuating lever and its stroke being so determined that the container be ejected by the thrusting effect of said plate beyond said socket in the direction of said distributor means.

23. A machine according to claim 1, wherein said control means are connected to said revolver-head and to said revolver-plate through a transmission comprising a stepwise driving system coupled to the vertical shaft of said revolver-plate and to said control means, a pair of meshing bevel gears fixed to the vertical revolver-head shaft and to the horizontal revolver-plate shaft respectively, the latter-mentioned bevel pinion having a pitch diameter equal to one and a half times that of the first-mentioned bevel gear.

24. A machine according to claim 1, wherein said distributor means receiving the ejected container from said revolver-plate includes a pivotal horizontal basket comprising a vertical end-closure, a pivot parallel to the revolver-plate shaft and mounted on the machine stand and supporting said vertical end-closure, a set of circularly aligned fingers mounted on said end-closure above said pivot and coaxial in the inoperative position with the axis of the socket from which the container is ejected, the distance between consecutive pairs of fingers being smaller than the width of a container and that between the terminal fingers in the set thereof being slightly greater than the width of the container, said fingers converging toward said revolver-plate and terminating in curved tips adapted to receive the rolled edge of the container; a part fixed to the machine stand, a vertical rod mounted thereon and bent at right angles at its top toward said revolver-plate and above said set of fingers whereby to form a finger having its tip curving away, a lever mounted on said pivot parallel with said revolver-plate, a roller mounted on the end of said lever and positioned in the circular path followed by that portion of the revolver-plate sockets which projects from the revolver-plate on the side of the second transfer device, a return spring connected across the machine stand and a point on said vertical end-closure located above said pivot, and slideways mounted on said stand for receiving the container distributed by said distributor means through the passageway bounded by the terminal fingers in the set thereof when said roller escapes from said projecting part of the socket and for conveying said container to said terminal heating means.

25. A machine according to claim 24, wherein said terminal heating means are disposed at the end of the distributor slideways and comprise two side plates fixed to the machine stand perpendicularly to the revolver-plate axis at a distance from each other slightly greater than the height of a finished container, a central vertical guide rail supported by one of said side plates and receiving the containers from said distributor, a lower vertical guide rail rigid with said two side plates, said rails lying in the vertical plane passing through the center of gravity of the finished pots they support, an electric motor supported by the other side plate, a sprocket wheel driven by said electric motor, an endless chain parallel with said side plates meshing with said sprocket wheel and extending parallel with said rails on that side thereof which is remote from the first side plate, entrainment pegs fixed to the chain links at intervals slightly greater than the width of a container, and an infra-red heating tube supported by the first side plate level with the motor shaft and penetrating into the interval bounded by said first side plate and said central guide rail, the distance between the tops of the two guide rails being such that when containers rest thereon and are guided laterally by said sideplates the bottom region of said containers be spaced from said heating tube.

26. A machine according to claim 25, wherein said means for ejecting the finished containers subsequent to the terminal heating means comprises a pipe of inner diameter slightly greater than the diameter of the containers, said pipe being disposed at the bottom of the first side plate and laterally in relation thereto, a blower mounted on the machine stand, a by-pass for connecting said blower to said pipe, and a nozzle inserted into said by-pass and having port in said pipe whereby to produce a negative pressure therein upstream of itself, the containers devoid of a bottom dropping under gravity beneath said terminal heating device.

27. A machine according to claim 1, wherein said bottom cutting and swaging means comprise a fixed circular die with a horizontal axis, a piston coaxial therewith connected through a transmission to said control means and arranged in the direction of the second transfer relatively to said die, a cylindrical swaging punch mounted on said piston and having an outer diameter substantially equal to the inner diameter of said die less twice the thickness of the cardboard strip out of which the container bottom is to be cut, a cutting ring mounted between said punch and said piston in such manner as to bound on said punch a length at least equal to the height of the bottom-flange and the outer diameter of which is substantially equal to the inner diameter of said die, means for advancing the cardboard strip along the face of said die opposite said punch, transmission means for connecting said strip advancing means to said control means, and means for rendering said transmission means inoperative when one of the frusto-conical revolver-head mandrels is devoid of a sleeve.

28. A machine according to claim 27, wherein the transmission between said cardboard strip advancing means and said control means and the means for rendering this transmission inoperative comprise a freewheel having a driving portion in the form of a sprocket wheel, a chain engaging with said driving portion, two springs for connecting the chain ends to the machine stand and to said control means respectively, a transverse catch fixed to the driving portion of said freewheel, a locking pawl positioned in the circular path of said catch, a locking spring constantly urging said locking pawl into engagement with said catch, an electromagnet having a core fixed to said locking pawl whereby to retract said catch against the countering action of said locking spring when said electromagnet is energized, a feed circuit for said electromagnet, a microswitch connected into said circuit beneath the location occupied by each frusto-conical revolver-head mandrel after the stepwise rotation which follows that during which the blank is wrapped about said mandrel, said microswitch maintaining said circuit closed when said mandrel is equipped with a sleeve and openng it when said mandrel is devoid of a sleeve.

29. A machine according to claim 28, wherein said third transfer device comprises a trough having an opening facing the exit of said die and formed into a loop terminating at the device for positioning the container bottom in the sleeve whereby to reverse said bottom in order to present it to said positioning device with the free edge of its flange facing the direction of said revolverhead, air delivery means disposed in said trough upstream of said opening, second air delivery means having port in said trough at the end of the loop therein, a blower mounted on the machine stand, pipe means connecting said blower to said two air delivery means, and a safety device connected to the cardboard strip advancing means whereby to arrest swaging and cutting of the bottoms in the event of an incorrectly shaped bottom reaching said trough.

30. A machine according to claim 29, wherein said safety device comprises a microswitch connected into said electromagnet feed circuit, and a rod penetrating into said trough anr adapted to operate said microswitch responsively to an incorrectly shaped bottom.

31. A machine according to claim 29, wherein the means for ejecting the waste material obtained through cutting the bevels and cutting and swaging the bottoms comprise a receptacle positioned beneath the bevel-cutting means, a pipe connected to said blower and having a terminal ejector leading into said receptacle, second pipe means tapped off the base of said receptacle, enclosure means positioned beneath said cutting and swaging means rearwardly of the die face facing said punch and into which said second pipe means have port on one of its walls, a second ejector positioned in said enclosure about the outlet of the second pipe means and ending through said wall, third pipe means connected to said blower and having port in said enclosure at right angles to said second pipe means, a bell-mouth positioned opposite the outlets of said second pipe means and said second ejector and bounding with said enclosure a space through which the perforated cardboard strip descends subsequent to swaging and cutting of the bottoms, and a discharge pipe connected to said bell-mouth.

References Cited
UNITED STATES PATENTS

| | | | |
|---|---|---|---|
| 1,917,374 | 7/1933 | Jones | 93—39.3 |
| 1,973,406 | 9/1934 | Cooley | 93—39.3 |
| 2,135,319 | 11/1938 | Reifsnyder | 93—39.3 |
| 2,642,784 | 6/1953 | Wittkuhns et al. | 93—39.3 |
| 2,719,466 | 10/1955 | Wittkuhns et al. | 93—39.3 X |
| 3,058,868 | 10/1962 | Schroeder | 156—211 X |

WILLIAM W. DYER, Jr., *Primary Examiner.*

JAMES M. MEISTER, *Examiner.*